(12) United States Patent
Fugetsu

(10) Patent No.: US 9,327,985 B2
(45) Date of Patent: May 3, 2016

(54) GRAPHENE OXIDE SHEET, ARTICLE CONTAINING GRAPHENE-CONTAINING SUBSTANCE PRODUCED BY REDUCING THE GRAPHENE OXIDE SHEET, AND PROCESS FOR PRODUCTION OF THE GRAPHENE OXIDE SHEET

(75) Inventor: Bunshi Fugetsu, Sapporo (JP)

(73) Assignee: NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 861 days.

(21) Appl. No.: 13/515,889

(22) PCT Filed: Dec. 18, 2009

(86) PCT No.: PCT/JP2009/071187
§ 371 (c)(1),
(2), (4) Date: Oct. 1, 2012

(87) PCT Pub. No.: WO2011/074125
PCT Pub. Date: Jun. 23, 2011

(65) Prior Publication Data
US 2013/0015409 A1    Jan. 17, 2013

(51) Int. Cl.
| | | |
|---|---|---|
| C01B 31/02 | (2006.01) | |
| C01B 31/04 | (2006.01) | |
| H01B 1/04 | (2006.01) | |
| B82Y 30/00 | (2011.01) | |
| B82Y 40/00 | (2011.01) | |
| F16D 69/02 | (2006.01) | |

(52) U.S. Cl.
CPC ............. *C01B 31/0476* (2013.01); *B82Y 30/00* (2013.01); *B82Y 40/00* (2013.01); *C01B 31/043* (2013.01); *F16D 69/026* (2013.01); *F16D 2200/006* (2013.01); *F16D 2200/0095* (2013.01)

(58) Field of Classification Search
CPC .................................. H01B 1/04; C01B 31/04
USPC ....... 252/500–511, 378 R; 423/445 R–447.1, 423/415.2, 445 B, 448; 977/734, 755, 842
See application file for complete search history.

(56) References Cited

U.S. PATENT DOCUMENTS

| | | | | |
|---|---|---|---|---|
| 2,176,879 | A * | 10/1939 | Bartell | 44/370 |
| 2005/0077503 | A1 | 4/2005 | Gotou et al. | |
| 2008/0023396 | A1 * | 1/2008 | Fugetsu | 210/502.1 |
| 2009/0087493 | A1 * | 4/2009 | Dai et al. | 424/490 |
| 2010/0028681 | A1 * | 2/2010 | Dai et al. | 428/408 |
| 2010/0056819 | A1 * | 3/2010 | Jang et al. | 556/478 |
| 2010/0144904 | A1 * | 6/2010 | Wang et al. | 516/98 |
| 2011/0037033 | A1 * | 2/2011 | Green et al. | 252/510 |
| 2013/0315815 | A1 * | 11/2013 | Lee et al. | 423/448 |

FOREIGN PATENT DOCUMENTS

| | | |
|---|---|---|
| JP | 2005-063951 A | 3/2005 |
| JP | 2009-275070 A | 11/2009 |

OTHER PUBLICATIONS

Cao et al. ("Preparation of organically dispersible graphene nanosheet powders through a lyophilization method and their poly(lactic acid) composites." Carbon, 48, pp. 3834-3839, online Jun. 25, 2010).*

Becerril et al. ("Evaluation of Solution-Processed Reduced Graphene Oxide Films as Transparent Conductors." ACSNano, 2(3), pp. 463-470, online Feb. 8, 2008).*

International Search Report dated Feb. 22,2010 for PCT/JP2009/071187.

English-language International Preliminary Report on Patentability and Written Opinion of the International Searching Authority, dated Jul. 10, 2012 for International Application PCT/JP2009/071187 filed Dec. 18, 2009; Applicants: National University Corporation Hokkaido University et al.

H.C. Schniepp et al., "Functionalized Single Graphene Sheets Derived from Splitting Graphite Oxide," *J. Phys. Chem.*, B110, (2006), pp. 8535 to 8539.

X. Wang et al., "Transparent, Conductive Graphene Electrodes for Dye-Sensitized Solar Cells," *Nano Lett.*, vol. 8, No. 1, (2008), pp. 323 to 327.

Jianfeng Shen et al., "Fast and Facile Preparation of Graphene Oxide and Reduced Graphene Oxide Nanoplatelets," *Chemistry of Materials*, vol. 21, Issue 15, (2009), pp. 3514 to 3520.

S. Watcharotone et al., "Graphene-Silica Composite Thin Films as Transparent Conductors," Nano Lett., vol. 7, No. 7, (2007), pp. 1888 to 1892.

\* cited by examiner

*Primary Examiner* — Tri V Nguyen
(74) *Attorney, Agent, or Firm* — Holtz, Holtz & Volek PC

(57) ABSTRACT

[Means for solving]A graphene oxide sheet which changes to a substance having a graphene structure when reduced, and which is obtainable by dispersing a graphene-containing carbon substance using a dispersant to reduce the size of the aggregate units of the graphene-containing carbon substance, and then oxidizing the graphene-containing carbon substance.

7 Claims, 11 Drawing Sheets

GRAPHENE OXIDE SHEET, ARTICLE CONTAINING GRAPHENE-CONTAINING SUBSTANCE PRODUCED BY REDUCING THE GRAPHENE OXIDE SHEET, AND PROCESS FOR PRODUCTION OF THE GRAPHENE OXIDE SHEET

TECHNICAL FIELD

The present invention relates to a graphene oxide sheet which changes to a substance having a graphene structure when reduced, an article containing a graphene-containing substance obtainable by reducing the graphene oxide sheet, and a method for producing the graphene oxide sheet.

BACKGROUND ART

It is conventionally known that when a substance having a structure in which graphene sheets are laminated, such as graphite, is oxidized, the graphene sheets constituting the substance can be peeled off sheet by sheet. As such, the technology for producing graphene sheets having a thickness in the atomic scale is expected as a core technology in the field of nanotechnology. For example, when graphitic graphene is oxidized, graphene oxide is obtained. Since this graphene oxide peels off into single sheets in water, there has been suggested a method of obtaining a graphene thin film by laminating the material on a substrate to produce a graphene oxide film, and then reducing the thin film (Non-Patent Literatures 1 to 3).

CITATION LIST

Non-Patent Literature

Non-Patent Literature 1: H. C. Schniepp, et al., J. Phys. Chem., B110 (2006) 8535.
Non-Patent Literature 2: S. Watcharotone, et al., Nano Lett. 7 (2007) 1888.
Non-Patent Literature 3: X. Wang, et al., Nano Lett. 8 (2008) 323.

SUMMARY OF INVENTION

Technical Problem

This technology for graphite oxidation treatment was already developed about 150 years ago. However, because productivity is low, and the reaction course is complicated, it was very difficult to produce high-quality graphene sheets in large quantities. In addition, as a physical method, there is known a method of peeling off graphene sheets one by one from graphite using an adhesive tape; however, this method is also not suitable for the production of graphene sheets in large quantities. Thus, it is an object of the invention to provide a graphene oxide sheet having high quality, a method for producing the graphene oxide sheet, and a substance having a graphene structure which is obtained by using the graphene oxide sheet.

Solution to Problem

Item (1) of the invention is a graphene oxide sheet which changes to a substance having a graphene structure when reduced,
the graphene oxide sheet being obtainable by dispersing a graphene-containing carbon substance using a dispersant to reduce the size of the aggregate units of the graphene-containing carbon substance, and then oxidizing the graphene-containing carbon substance.

Item (2) of the invention is the graphene oxide sheet of the invention item (1), which is obtained by centrifuging a colloidal solution prepared by dispersing the graphene-containing substance, to thereby remove agglomerated graphene aggregates, and then oxidizing the graphene-containing carbon substance.

Item (3) of the invention is the graphene oxide sheet of the invention item (1) or (2), wherein the dispersant is a surfactant.

Item (4) of the invention is the graphene oxide sheet of any one of the invention items (1) to (3), wherein the graphene oxide sheet is purified by an ion exchange treatment.

Item (5) of the invention is the graphene oxide sheet of any one of the invention items (1) to (4), wherein in the process of oxidizing, an oxidizing agent is added to a colloidal solution containing the graphene-containing carbon substance, subsequently removing water to adjust the water content to 10 wt % or less, preparing a powder composition containing an oxidizing agent and a graphene-containing carbon substance, followed by mixing the powder composition and concentrated sulfuric acid to oxidize the graphene-containing carbon substance.

Item (6) of the invention is the graphene oxide sheet of any one of the invention items (1) to (5), wherein in the process of removing water, the powder composition containing an oxidizing agent and a graphene-containing carbon substance is prepared by lyophilization.

Item (7) of the invention is the graphene oxide sheet of the invention item (5) or (6), wherein the oxidizing agent is permanganate or peroxodisulfate.

Item (8) of the invention is the graphene oxide sheet of any one of the invention items (1) to (7), wherein the graphene-containing carbon substance is one substance, or a combination of two or more substances, selected from the group consisting of carbon nanotubes, carbon nanofibers, carbon fibers, carbon nanohorns, graphite, and fullerenes.

Item (9) of the invention is a graphene-containing substance obtainable by reducing the graphene oxide sheet described in any one of the invention items (1) to (8).

Item (10) of the invention is a friction material containing the graphene-containing substance obtainable by reducing the graphene oxide sheet of any one of the invention items (1) to (8).

Item (11) of the invention is the friction material of the invention item (10), further containing an organic fiber and a thermosetting resin.

Item (12) of the invention is the friction material of the invention item (10) or (11), which is obtained by impregnating a paper made from the organic fiber, with a solution of the graphene oxide sheet, drying the paper, subsequently reducing the graphene oxide sheet, further impregnating the paper with the thermosetting resin, and curing the thermosetting resin.

Item (13) of the invention is the friction material of the invention item (11) or (12), wherein the organic fiber is a natural organic fiber.

Item (14) of the invention is the friction material of any one of the invention items (11) to (13), wherein the thermoplastic resin is one resin, or a combination of two or more resins, selected from the group consisting of phenolic resins, modified phenolic resins, epoxy resins, modified epoxy resins, and melamine resins.

Item (15) of the invention is a conductive fiber, obtainable by reducing the graphene oxide sheet of any one of the invention items (1) to (8) within a fiber.

Item (16) of the invention is the conductive fiber of the invention item (15), obtainable by dyeing the fiber using the graphene oxide sheet, and then reducing the graphene oxide sheet.

Item (17) of the invention is the conductive fiber of the invention item (16), wherein the dyeing is carried out using an aqueous solution of the graphene oxide sheet.

Item (18) of the invention is the conductive fiber of the invention item (16) or (17), wherein the fiber is one fiber, or a combination of two or more fibers, selected from the group consisting of polyallylates, aramid fibers, polyesters, nylon, cotton, and hemp.

Item (19) of the invention is the conductive fiber of the invention item (15), obtainable by kneading the graphene oxide sheet in a polymer, spinning the kneading product, and then reducing the graphene oxide sheet.

Item (20) of the invention is the conductive fiber of the invention item (19), wherein the polymer is one polymer, or a combination of two or more polymers, selected from the group consisting of polyvinyl alcohol (PVA), polyethylene terephthalate (PET), and polyesters.

Item (21) of the invention is a conductive material, obtainable by covering the surface of polymer particles with the graphene oxide sheet of any one of the invention items (1) to (8), and reducing aggregates of the polymer particles.

Item (22) of the invention is the conductive material of the invention item (21), wherein the polymer particles are further crosslinked.

Item (23) of the invention is the conductive material of the invention item (22), obtainable by mixing a polymer emulsion with the graphene oxide sheet, removing water, and crosslinking the polymer.

Item (24) of the invention is the conductive material of the invention item (21) or (22), wherein the polymer particles are formed of a fluororesin.

Item (25) of the invention is a carbon fiber, obtainable by spinning a mixture containing the graphene oxide sheet described in any one of the invention items (1) to (8) and polyacrylonitrile, and flame-proofing and carbonizing the spinning product.

Item (26) of the invention is a high-strength lightweight metal material, obtainable by mixing an aqueous solution of the graphene oxide sheet of any one of the invention items (1) to (8) and a metal powder, drying the mixture, and subjecting the mixture simultaneously to heating and pressurization by melting and sintering.

Item (27) of the invention is the high-strength lightweight metal material of the invention item (26), wherein the melting and sintering is carried out by discharge plasma sintering.

Item (28) of the invention is the high-strength lightweight metal material of the invention item (26) or (27), wherein the metal is aluminum.

Item (29) of the invention is a method for producing a graphene oxide sheet which changes to a compound having a graphene structure when reduced, the method including:
a dispersing step of dispersing a graphene-containing carbon substance with a dispersant to reduce the size of the aggregate units of the graphene-containing carbon substance; and
an oxidizing step of oxidizing the graphene-containing carbon substance after the dispersing step.

Item (30) of the invention is the production method of the invention item (29), further including a centrifuging step of centrifuging a colloidal solution prepared by dispersing the graphene-containing substance, which is obtained by the dispersing step, to thereby remove agglomerated graphene aggregates.

Item (31) of the invention is the production method of the invention item (29) or (30), wherein the dispersant is a surfactant.

Item (32) of the invention is the production method of any one of the invention items (29) to (31), including a purifying step of purifying the graphene oxide sheet produced by being oxidized in the oxidizing step, by an ion exchange treatment.

Item (33) of the invention is the production method of any one of the invention items (29) to (32), wherein the oxidizing step includes:
a water removing step of adding an oxidizing agent to a colloidal solution containing a graphene-containing carbon substance, and further removing water to adjust the water content to 10 wt % or less; and
an acid treatment step of mixing the water-removed composition with concentrated sulfuric acid to oxidize the graphene-containing carbon substance.

Item (34) of the invention is the production method of any one of the invention items (29) to (33), wherein in the water removing step, a powder composition containing an oxidizing agent and a graphene-containing carbon substance is prepared by lyophilization.

Item (35) of the invention is the production method of the invention item (33) or (34), wherein the oxidizing agent is permanganate or peroxodisulfate.

Item (36) of the invention is the production method of any one of the invention items (29) to (35), wherein the graphene-containing carbon substance is one substance, or a combination of two or more substances, selected from the group consisting of carbon nanotubes, carbon nanofibers, carbon fibers, carbon nanohorns, graphite, and fullerenes.

Item (37) of the invention is a method for producing a graphene-containing substance, the method including reducing the graphene oxide sheet of any one of the invention items (1) to (8).

Item (38) of the invention is a method for producing a friction material containing a graphene-containing substance, the method including reducing the graphene oxide sheet of any one of the invention items (1) to (8).

Item (39) of the invention is the method for producing a friction material of the invention item (38), wherein a mixture of the graphene oxide sheet and an organic fiber is reduced by applying a reducing agent.

Item (40) of the invention is the method for producing a friction material of the invention item (38) or (39), wherein the friction material is obtained by impregnating a paper made from an organic fiber, with a solution of the graphene oxide sheet, drying the paper, subsequently reducing the graphene oxide, further impregnating the paper with a thermosetting resin, and curing the thermosetting resin.

Item (41) of the invention is the method for producing a friction material of the invention item (39) or (40), wherein the organic fiber is a natural organic fiber.

Item (42) of the invention is the method for producing a friction material of any one of the invention items (39) to (41), wherein the thermoplastic resin is one resin, or a combination of two or more resins, selected from the group consisting of phenolic resins, modified phenolic resins, epoxy resins, modified epoxy resins, and melamine resins.

Item (43) of the invention is a method for producing a conductive fiber, the method including reducing the graphene oxide sheet of any one of the invention items (1) to (8) within a fiber.

Item (44) of the invention is the method for producing a conductive fiber of the invention item (43), the method including dyeing the fiber using the graphene oxide sheet, and then reducing the graphene oxide sheet.

Item (45) of the invention is the method for producing a conductive fiber of the invention item (44), wherein the dyeing is carried out using an aqueous solution of the graphene oxide sheet.

Item (46) of the invention is the method for producing a conductive fiber of the invention item (44) or (45), wherein the fiber is one fiber, or a combination of two or more fibers, selected from the group consisting of polyallylates, aramid fibers, polyesters, nylon, cotton, and hemp.

Item (47) of the invention is the method for producing a conductive fiber of the invention item (43), the method including kneading the graphene oxide sheet in a polymer, spinning the kneading product, and then reducing the graphene oxide sheet.

Item (48) of the invention is the method for producing a conductive fiber of the invention item (47), wherein the polymer is one polymer, or a combination of two or more polymers, selected from the group consisting of polyvinyl alcohol (PVA), polyethylene terephthalate (PET), and polyesters.

Item (49) of the invention is a method for producing a conductive material, the method including covering the surface of polymer particles with the graphene oxide sheet of any one of the invention items (1) to (8), and reducing aggregates of the polymer particles.

Item (50) of the invention is the method for producing a conductive material of the invention item (49), the method further including crosslinking the polymer particles.

Item (51) of the invention is the method for producing a conductive material of the invention item (50), the method including mixing a polymer emulsion with the graphene oxide sheet, removing water, and crosslinking.

Item (52) of the invention is the method for producing a conductive material of the invention item (49) or (50), wherein the polymer particles are a fluororesin.

Item (53) of the invention is the method for producing a carbon fiber, the method including spinning a mixture of the graphene oxide sheet of any one of the invention items (1) to (8) and polyacrylonitrile, and flame-proofing and carbonizing the spinning product.

Item (54) of the invention is the method for producing a high-strength lightweight metal material, the method including mixing an aqueous solution of the graphene oxide sheet of any one of the invention items (1) to (8) and a metal powder, drying the mixture, and subjecting the mixture simultaneously to heating and pressurization by melting and sintering.

Item (55) of the invention is the method for producing a high-strength lightweight metal material of the invention item (54), wherein the melting and sintering is carried out by discharge plasma sintering.

Item (56) of the invention is the method for producing a high-strength lightweight metal material of the invention item (55), wherein the metal is aluminum.

Hereinafter, the meanings of the various terms used in the present specification will be explained. A "graphene oxide sheet" means a substance which changes to a substance having a graphene structure when reduced.

Advantageous Effects of Invention

According to the graphene oxide sheet and the method for production thereof according to the invention, since graphene oxide sheets can be produced by a chemical method, graphene oxide sheets can be produced in large quantities. Furthermore, since graphene oxide sheets can be obtained even under mild oxidizing conditions, the problem that excessive oxidation causes defects such as hole opening in the graphene sheets, does not easily occur. That is, when a graphene-containing carbon substance is dispersed using a dispersant, the graphene-containing carbon substance is scattered apart. For example, when the graphene-containing substance is graphite, the graphene sheets that are piled up in layers are dispersed and scattered apart, thereby forming graphite units having a smaller number of laminated layers. Furthermore, when the graphene-containing substance is carbon nanotubes, aggregated clusters are dispersed by a surfactant, and thus a state in which smaller clusters or individual nanotubes are dispersed is attained. Thereby, the exposed area of graphene in the graphene-containing carbon substance is increased, and therefore, graphene sheets can be sufficiently oxidized even under mild oxidizing conditions. Accordingly, since the graphene oxide sheets thus obtainable have fewer defects, when the graphene oxide sheets according to the invention are used after reducing them, for example, a graphene-containing substance having high electrical conductivity, excellent mechanical strength, excellent wear resistance, excellent electromagnetic wave absorption, and excellent pyrogenicity can be obtained.

According to the invention items (2) and (30), when graphene aggregates in an agglomerated state are removed by centrifugation, a graphene-containing carbon substance which has aggregated and becomes not easily oxidizable can be removed, and thereby, an oxidation treatment can be more easily carried out.

According to the invention items (3) and (31), the aggregate units of a graphene-containing carbon substance can be easily reduced in size by means of a surfactant.

According to the invention items (4) and (32), a metal salt of a carboxyl group produced by an oxidation treatment is converted to a carboxyl group having a proton through an ion exchange treatment, and thereby a metal ion can be eliminated. Thus, handling thereof in the subsequent processes is facilitated.

According to the invention items (5) to (8) and (33) to (36), graphene oxide having fewer defects can be obtained.

According to the invention items (9) and (37), since graphene sheets with fewer defects are obtained, the graphene sheets have high electrical conductivity, excellent mechanical strength, excellent wear resistance, excellent electromagnetic wave absorption, and excellent pyrogenicity.

According to the invention items (10) and (38), since the uniform surfaces can be formed, a friction material having less occurrence of heat spots at which heat increases locally due to the frictional heat, can be obtained.

According to the invention items (11) to (14) and (39) to (42), a paper-like friction material based on an organic fiber and a thermoplastic resin, which has less occurrence of heat spots, can be obtained.

According to the invention items (15) and (43), when graphene oxide is caused to exist within a fiber, and the graphene oxide is reduced, a conductive fiber can be easily obtained.

According to the invention items (16) to (18) and (44) to (46), electrical conductivity can be imparted to a fiber, by a method similar to a method of dyeing a fiber.

According to the invention items (19), (20), (47) and (48), not only conductivity is obtained, but also higher strength may be obtained because a graphene-containing carbon substance is formed within the fiber.

According to the invention items (21), (24), (49) and (52), since a conductive network is formed, a conductive material having high electrical conductivity can be obtained.

According to the invention items (22) and (50), since polymer particles are crosslinked, a conductive material having high strength can be obtained.

According to the invention items (23) and (51), a conductive sheet having high electrical conductivity can be obtained.

According to the invention items (25) and (53), a carbon fiber having high tensile strength and high tensile modulus can be obtained.

According to the invention items (26), (27), (54) and (55), a high-strength lightweight metal material formed from a metal and a graphene-containing carbon substance can be obtained.

According to the invention items (28) and (56), the performance and efficiency of the manufactured product are markedly enhanced as compared with iron materials, as a result of weight reduction of the material and the realization of excellent properties. As a result, for example, when the material is used in automotive vehicles, the vehicle weight can be reduced, and thereby reduction of the amount of carbon dioxide emission can be realized.

DESCRIPTION OF EMBODIMENTS

<<Graphene Oxide Sheet>>

Figure 1:
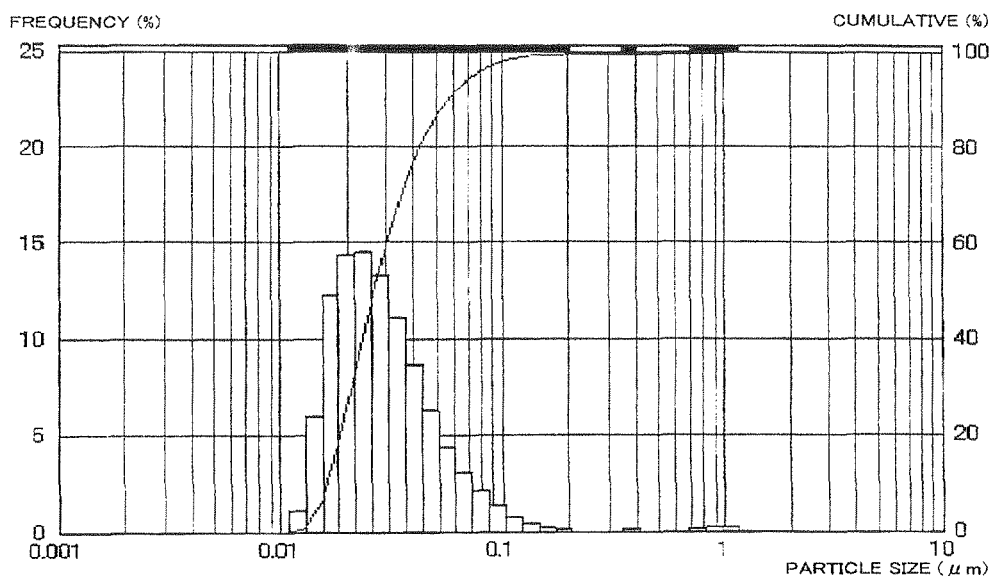
FIG. 1 is a diagram illustrating the analysis results for the particle size distribution of the colloidal solution according to Reference Example 1.

The graphene oxide sheet according to the invention is a substance which changes to a substance having a graphene structure when reduced, and is characterized in that the graphene oxide sheet may be obtained by dispersing a graphene-containing carbon substance using a dispersant to reduce the size of the aggregate units of the graphene-containing carbon substance, and then oxidizing the graphene-containing carbon substance. When the size of the aggregate units of the graphene-containing carbon substance is reduced, the graphene-containing carbon substance can be oxidized under milder oxidizing conditions. Therefore, graphene oxide sheets having fewer defects caused by excessive oxidation are obtained. Furthermore, it is suitable to remove agglomerated graphene aggregates by centrifuging a colloidal solution in which a graphene-containing substance is dispersed. Since large agglomerated graphene aggregates that are not easily oxidizable are removed thereby, the graphene-containing substance can be more easily oxidized.

When the graphene-containing carbon substance is graphite, the aggregate units are usually in a state in which graphene sheets are piled up in layers (the number of layers being usually about several thousands to several ten thousands). This can be treated to reduce the size of the aggregate units by using a dispersant. More specifically, there are no particular limitations on the size of the aggregate units of graphite after dispersion; however, in regard to the particle size distribution in the case of regarding graphite aggregates as particles, it is suitable that 80% of the particles have a size of 500 nm or less, while it is more suitable that 80% of the particles have a size of 300 nm or less. Similarly, the average particle size of the particles is suitably 500 nm or less, and more suitably 300 nm or less. Here, the size of the aggregate units is a value determined by a dynamic light scattering type particle size distribution analysis. These aggregate units are in the form of laminates having about one thousand layers or less.

Here, according to the invention, the graphene-containing carbon substance is not particularly limited as long as it is a substance having a graphene skeleton, and examples thereof include carbon nanotubes (single layer, double-layer, multi-layer types, and cup-stack type), carbon nanofibers, carbon fibers, carbon nanohorns, graphite, and fullerenes.

Among the graphene-containing carbon substances, when graphite is used, the graphene oxide thus obtainable acquires a flake shape. The ratio of the average length and the average width of the graphene oxide sheet is suitably 0.1 to 10, and more suitably 1.0 to 3.3. The length of the graphene oxide sheet is suitably 10 nm to 500 µm, and more suitably 500 nm to 2 µm. These various parameters related to the shape can be measured using an atomic force microscope.

When carbon nanotubes are used as the graphene-containing carbon substance, the graphene oxide sheet acquires a band shape. The width of the band-shaped graphene oxide sheet is suitably 6 nm to 300 nm. These data related to the shape can be measured using a transmission electron microscope.

<<Production Method>>

The method for producing a graphene oxide sheet according to the invention is characterized by including a dispersing step of dispersing a graphene-containing carbon substance using a dispersant, and thereby reducing the size of the aggregate units of the graphene-containing carbon substance; and an oxidizing step of oxidizing the graphene-containing carbon substance after the dispersing step. Furthermore, it is suitable that the method includes, as optional steps, a centrifuging step of centrifuging a colloidal solution obtained by the dispersing step to thereby remove agglomerated graphene aggregates, or a purifying step of purifying the carbon substance that has been oxidized in the oxidizing step through an ion exchange treatment.

Dispersing Step

In this step, a graphene-containing carbon substance is dispersed using a dispersant, and thus the size of the aggregate units of the graphene-containing carbon substance is reduced. Since the graphene-containing substance that has aggregated and become agglomerated can be thereby broken into smaller units, oxidation can be carried out under mild conditions in the subsequent oxidizing step.

Furthermore, in the present step, it is suitable to use a surfactant as the dispersant. Here, there are no particular limitations on the dispersant, but examples include surfactants such as anionic surfactants and cationic surfactants; zwitterionic surfactants; nonionic surfactants; host compounds forming inclusion compounds such as cyclodextrins; naturally occurring macromolecular compounds such as nucleic acids and proteins; and bile acids. Examples of the anionic surfactants include surfactants of alkyl sulfuric acid ester salts, polyoxyethylene alkyl ether sulfuric acid ester salts, alkylbenzenesulfonic acid salts, naphthalenesulfonic acid-formalin condensates, and fatty acid salts, which are used singly or as mixtures. Examples of the cationic surfactants include surfactants of alkylamine salts, for example, alkylbenzyldimethylammonium, distearyldimethylammonium, stearyltrimethylammoniums, which are used singly or as mixtures. Examples of the nonionic surfactants include polyoxyethylene alkyl ethers, polyoxyalkylene derivatives, sorbitan fatty acid esters, polyoxyethylene sorbitan fatty acid esters, polyoxyethylene sorbitol fatty acid esters, glycerin fatty acid esters, and polyoxyethylene hardened castor oils, which are used singly or as mixtures. Examples of the zwitterionic surfactants include zwitterionic surfactants having phosphoric acid groups as functional groups, for example, phosphatidylcholines {for example, distearoylphosphatidylcholine (DSPC), dimyristoylphosphatidylcholine (DMPC), and dipalmitoylphosphatidylcholine (DPPC)}, phosphatidylethanolamine, phosphatidylinositol, phosphatidylserine, phosphatidylglycerol, diphosphatidylglycerol, lysophosphatidylcholine, and sphingomyelin. In addition, zwitterionic surfactants of quaternary ammonium salt group/sulfonic acid group ($—SO_3H$) type, quaternary ammonium salt group/phosphoric acid group type (soluble in water), quaternary ammonium salt group/phosphoric acid group type (insoluble in water), and quaternary ammonium salt group/carboxyl group type are available. The acid groups described above may also be in the form of salts. Particularly, those zwitterionic surfactants described above which have both positive (+) charge and negative (−) charge in one molecule are suitable, and the acid dissociation constant (pKa) of the acid group described above is preferably 5 or less, more preferably 4 or less, and even more preferably 3 or less. Specific examples include sulfobetaine-based zwitterionic surfactants such as 3-[(3-cholamidopropyl)dimethylamino]-2-hydroxy-1-propanesulfonic acid (CHAPSO), 3-[(3-cholamidopropyl)dimethylamino]-propanesulfonic acid (CHAPS), N,N-bis(3-D-gluconamidopropyl)-cholamide, n-octadecyl-N,N'-dimethyl-3-amino-1-propanesulfonic acid, n-decyl-N,N'-dimethyl-3-amino-1-propanesulfonic acid, n-dodecyl-N,N'-dimethyl-3-amino-1-propanesulfonic acid, n-tetradecyl-N,N'-dimethyl-3-amino-1-propanesulfonic acid {ZWITTERGENT (trade mark)-3-14}, n-hexadecyl-N,N'-dimethyl-3-amino-1-propanesulfonic acid, and n-octadecyl-N,N'-dimethyl-3-amino-1-propanesulfonic acid; phospho-choline-based zwitterionic surfactants such as n-octylphosphocholine, n-nonylphosphocholine, n-decylphosphocholine, n-dodecylphosphocholine, n-tetradecylphosphocholine, and n-hexadecylphosphocholine; and phosphatidylcholine-based zwitterionic surfactants such as dilauroylphosphatidylcholine, dimyristoylphosphatidylcholine, dipalmitoylphosphatidylcholine, distearoylphosphatidylcholine, dioleoylphosphatidylcholine, and dilinoleoylphosphatidylcholine. Examples of the "bile acids" include cholic acid, glycocholic acid, taurocholic acid, kenodeoxycholic acid, hyocholic acid, ursodeoxycholic acid, 5α-cyprinol, deoxycholic acid, lithocholic acid, and hyodeoxycholic acid. Among these dispersants, particularly suitable dispersants for use are mixtures of a zwitterionic or nonionic surfactant with a cationic or anionic surfactant. Even among these, it is suitable to use zwitterionic surfactants. Among the zwitterionic surfactants, it is particularly suitable to use sulfobetaine-based zwitterionic surfactants. The amount of the dispersant used is suitably 0.01 wt % to 10.0 wt %, more suitably 0.1 wt % 5.0 wt %, and even more suitably 0.2 wt % to 2.0 wt %, based on the graphene-containing carbon material.

Centrifuging Step

In the centrifuging step, a colloidal solution in which a graphene-containing carbon substance has been dispersed is centrifuged, and thus agglomerated graphene aggregates are removed. Through this step, large agglomerated graphene aggregates are can be removed, and a less piled graphene-containing carbon substance can be obtained. Here, with regard to the conditions for centrifugation, known conditions can be appropriately set.

Oxidizing Step

In the oxidizing step, the graphene-containing carbon substance obtained after the dispersing step is oxidized. The method for the oxidation treatment of the graphene-containing carbon substance can be conventionally carried out by a known method such as a method of oxidizing the graphene-containing carbon substance using an oxidizing agent such as a chloric acid salt, or a method of treating the graphene-containing carbon substance with concentrated sulfuric acid, a nitric acid salt, and potassium permanganate. However, the previous step enables oxidation of graphene even under mild conditions.

In regard to the present step, it is suitable that the step includes, for example, a water removing step of adding an oxidizing agent to the colloidal solution containing the graphene-containing carbon substance, further removing water to adjust the water content to 10 wt % or less (suitably 5 wt % or less); and an acid treatment step of mixing the composition from which water has been removed, with concentrated sulfuric acid to oxidize the graphene-containing substance. Examples of the oxidizing agent used in the water removing step include permanganates such as potassium permanganate; and peroxodisulfates such as ammonium peroxodisulfate and sodium peroxodisulfate. Examples of the acid used in the acid treatment step include concentrated sulfuric acid and concentrated nitric acid. In the acid treatment step, for example, it is suitable to carry out the acid treatment under low temperature conditions such as at 25° C. or below.

In the water removing step, it is suitable to perform lyophilization and to prepare a powder composition containing the oxidizing agent and the graphene-containing carbon substance. As such, when the powder composition is prepared, water can be sufficiently removed, and an acid at a high concentration can be applied to the subsequent acid treatment step. Accordingly, the reaction proceeds efficiently. Furthermore, when lyophilization is achieved as such in the presence of the oxidizing agent, the oxidizing agent enters into between the aggregates of the graphene-containing substance and turns into a powder form. Therefore, the oxidizing agent efficiently reacts with the graphene sheets in the subsequent acid treatment step, and the treatment time is shortened.

Purifying Step

In the purifying step, the graphene oxide sheet produced through oxidation in the previous oxidizing step is purified. In regard to the purification method, any known purification method can be used, but it is suitable to perform purification through an ion exchange treatment. That is, a graphene oxide sheet having high purity can be obtained through the process of purification by an ion exchange treatment. In this step, for example, it is suitable to carry out purification by using an anion exchange column (a strong base type ion exchange resin) and a cation exchange column (a strong acid type ion exchange resin), and to convert the graphene oxide sheet to a graphene acid sheet. Through the ion exchange treatment, the carboxyl group introduced into the graphene oxide sheet is converted from the state of being in a salt form by the oxidation treatment, to an acidic carboxyl group having free proton.

Examples of the strong base type ion exchange resin include IRA-402 (manufactured by ORGANO CORPORATION) and SBR-P-C (manufactured by MUROMACHI CHEMICALS INC.). Examples of the strong acid type ion exchange resin include 15DRY (sulfonic acid group type, manufactured by ORGANO CORPORATION) and HCR-W2 (manufactured by MUROMACHI CHEMICALS INC.).

<<Method of Use>>

The graphene oxide sheet according to the invention can be used as a graphene sheet by applying the graphene oxide sheet on an object and reducing the graphene oxide sheet. Here, it is suitable to use a reducing agent at the time of reducing the graphene oxide sheet.

As the reducing agent to be used, any known reducing agent can be used, but examples thereof include hydroxymethanesulfinic acids, ascorbic acids, thioglycolic acids, cysteines, sulfurous acids, thiosulfuric acids, and dithionous acids. Examples of the hydroxymethanesulfinic acids include hydroxymethanesulfinic acid and hydroxymethanesulfinic acid salts, and examples of the hydroxymethanesulfinic acid salts include sodium hydroxymethanesulfinate. Examples of the ascorbic acids include ascorbic acid, ascorbic acid salts, ascorbic acid derivatives, erythorbic acid, erythorbic acid salts, and erythorbic acid derivatives. Examples of the ascorbic acid salts and erythorbic acid salts include sodium ascorbate, potassium ascorbate, calcium ascorbate, ammonium ascorbate, monoethanolamine ascorbate, diethanolamine ascorbate, and sodium erythorbate. Examples of the ascorbic acid derivatives and erythorbic acid derivatives include ascorbic acid sulfuric acid ester disodium, erythorbic acid sulfuric acid ester disodium, ascorbic acid phosphoric acid ester magnesium, ascorbyl palmitate, ascorbyl stearate, ascorbyl dipalmitate, ascorbyl tetra-2-hexyldecanoate, ascorbyl myristate, ascorbyl laurate, ascorbyl acetate, ascorbyl propionate, ascorbyl tartrate, ascorbyl citrate, ascorbyl succinate, ascorbyl benzoate, potassium (ascorbyl/tocopheryl) phosphate, ascorbylethyl, alantoin ascorbate, chitosan ascorbate, methylsilanol ascorbate, tetradecyl hexyl ascorbyl, aminopropyl ascorbyl phosphate, ascorbic acid polypeptide, ascorbyl glucoside, and ascorbyl methylsilanol pectinate. Examples of the thioglycolic acids include thioglycolic acid, thioglycolic acid salts, and thioglycolic acid esters. Examples of the thioglycolic acid salts include ammonium thioglycolate and sodium thioglycolate. Examples of the thioglycolic acid esters include glycerin thioglycolate. Examples of the cysteines include cysteine, cysteine hydrochloride, and N-acetyl-L-cysteine. Examples of the sulfurous acids include sulfurous acid, sulfuric acid salts, and bisulfurous acid salts. Examples of the sulfurous acid salts or bisulfurous acid salts include ammonium salts, sodium salts, and potassium salts. Examples of the thiosulfuric acids include thiosulfuric acid and thiosulfuric acid salts, and examples of the thiosulfuric acid salts include sodium thiosulfate and potassium thiosulfate. Examples of the dithionous acids include dithionous acid and dithionous acid salts, and examples of the dithionous acid salts include sodium dithionite (sodium hydrosulfite) and potassium dithionite.

Application Examples

<Friction Material>

The graphene oxide according to the invention can be applied as, for example, a friction material that is used in the clutches or brakes of automobiles. That is, when a graphene-containing carbon material originating from the graphene oxide sheet according to the invention is incorporated, heat spots at which heat increases locally due to frictional heat, do not easily occur. Here, examples of the friction material include a sintered metal friction material which contains a metal powder such as copper or tin, a friction adjusting material such as a ceramic material, and a lubricating material such as a graphene-containing substance, and is produced by forming and sintering these materials; a paper-like friction material containing an organic fiber such as pulp or aramid, a friction adjusting material such as a ceramic material, and a lubricating material such as a graphene-containing substance; and a resin mold friction material prepared by mixing a thermosetting resin such as a phenolic resin, an organic/inorganic fiber, a friction material such as a ceramic material, and a lubricating material such as a graphene-containing substance, and molding and thermosetting the mixture. Among these, the invention will be described in detail by taking a paper-like friction material as an example.

In regard to the paper-like friction material, a paper containing a graphene-containing carbon material can be obtained by impregnating a paper made from an organic fiber such as pulp or aramid, with an aqueous solution of the graphene oxide sheet according to the invention, drying the paper, and then reducing the graphene oxide sheet using a reducing agent. Furthermore, when this paper is impregnated with a thermosetting resin material such as an epoxy resin, a paper-like friction material can be obtained.

As the organic fiber, more particularly a naturally occurring fiber such as linter pulp; or a synthetic organic fiber such as a polyamide fiber, an aramid fiber, a phenolic fiber, or a rayon fiber, can be used. In order to increase the mechanical strength of the friction material, an inorganic fiber such as a glass fiber, a carbon fiber, or a ceramic fiber can be incorporated into an organic fiber. In addition to that, as a filler material that is incorporated into a fiber, an inorganic powder of cokes, mica, vermiculite, molybdenum disulfide, barium sulfate, calcium carbonate, iron oxide, silica, or diatomaceous earth; or an organic powder such as a cashew dust, a fluororesin powder, or a thermosetting (spherical) resin, is used. Examples of the thermosetting resin include (modified) phenolic resins, (modified) epoxy resins, and melamine resins.

Here, the weight ratio of the graphene-containing carbon material with respect to the organic fiber is suitably 0.01 wt % to 30 wt %, more suitably 0.01 wt % to 10 wt %, and even more suitably 0.1 wt % to 1 wt %. Furthermore, the weight ratio of the thermosetting resin to be impregnated with respect to the organic fiber is suitably 0.1 wt % to 10 wt %, more suitably 0.1 wt % to 5 wt %, and even more suitably 0.3 wt % to 0.5 wt %. Furthermore, the dynamic friction coefficient of the friction material is suitably 0.10 to 0.20, more suitably 0.10 to 0.15, and even more suitably 0.10 to 0.13. The amount of wear is suitably 60 μm or less.

<Conductive Fiber>

The graphene oxide according to the invention can be applied to a conductive fiber. That is, when graphene oxide is incorporated into a fiber and reduced, a conductive fiber can be easily obtained. As specific embodiments of the conductive fiber, a dyed type conductive fiber and a kneaded type conductive fiber will be described as examples.

Dyed Type Conductive Fiber

In the best mode of the invention, the dyed type conductive fiber can be obtained by dyeing a fiber using the graphene oxide sheet and reducing the graphene oxide sheet. More specifically, when a fiber or leather is dyed using an aqueous colloidal solution containing the graphene oxide sheet as an aqueous dye, and reducing the graphene oxide sheet using a reducing agent, a graphene-containing carbon substance can be built on a fiber. Thereby, high electrical conductivity can be imparted. Furthermore, the fiber acquires high strength. Examples of the fiber used herein include chemical yarns such as a polyallylate fiber, an aramid fiber, a polyester fiber, and a nylon fiber; and natural yarns such as cotton and hemp. The aqueous colloidal solution containing the graphene oxide sheet used herein can be easily prepared by dissolving the graphene oxide sheet in water. Furthermore, as the reducing agent used herein, those described above can be used.

In the dyed type conductive fiber, the amount of deposit of the graphene oxide sheet is suitably 0.01 wt % to 10 wt %, more suitably 0.1 wt % to 8 wt %, and even more suitably 0.1 wt % to 5 wt %. The conductivity of the dyed type conductive fiber is suitably $10^{10}$ Ω/cm or less, more suitably $10^5$ Ω/cm or less, and even more suitably $10^3$ Ω/cm. There are no particular limitations on the lower limit, but for example, the lower limit is $10^{-3}$ Ω/cm.

Kneaded Type Conductive Fiber

Regarding the kneaded type conductive fiber, a conductive fiber can be obtained by kneading the graphene oxide sheet into a polymer, spinning a fiber, and then reducing the graphene oxide sheet. Furthermore, the kneaded type conductive fiber can acquire not only conductivity but also higher strength because a graphene-containing carbon substance is formed within the fiber. The kneaded type conductive fiber can be obtained by spinning a fiber from a solution in which a polymer and the graphene oxide sheet are dissolved, removing the solvent by drying, subsequently stretching the fiber, and finally reducing the graphene oxide sheet. Here, the process of spinning can be carried out by a known method. Furthermore, the process of reduction can also be carried out by using the reducing agents described above.

As the polymer used herein, polyvinyl alcohol (PVA), polyethylene terephthalate (PET), polyester, nylon, polypropylene, polyacrylonitrile, polyurethane, polyamide, polyvinylidene chloride, polyvinyl acetate, polyurea, rayon, and the like can be used.

In the kneaded type conductive fiber, the content of the graphene oxide sheet is suitably 0.01 wt % to 50 wt %, more suitably 0.1 wt % to 30 wt %, and even more suitably 0.5 wt % to 20 wt %. The conductivity of the kneaded type conductive fiber is suitably $10^{10}$ Ω/cm or less, more suitably $10^6$ Ω/cm or less, and even more suitably $10^5$ Ω/cm. There are no particular limitations on the lower limit, but for example, the lower limit is $10^{-3}$ Ω/cm.

<Conductive Material>

The conductive material according to the best mode of the invention can be obtained by covering the surfaces of polymer particles with the graphene oxide sheet according to the invention, and reducing the aggregates of the polymer particles. Thereby, the graphene oxide sheets adhering to the particle surfaces are reduced, and a graphene-containing carbon material is formed on the surfaces of the polymer particles. Since a conductive network is formed thereby, a conductive material having high electrical conductivity can be obtained. Furthermore, it is suitable to crosslink these polymer particles. Here, the process of reduction can be carried out by using the reducing agents described above. Hereinafter, a conductive film prepared by using an emulsion as the polymer particles, and a conductive resin prepared by using a fluororesin as the polymer particles will be described in detail as examples.

Conductive Film

The graphene oxide according to the invention can be applied as a conductive film by reducing the graphene oxide for use. For the conductive film, a polymer emulsion such as a polyester emulsion is used as the polymer particles. In regard to the conductive film, a conductive sheet can be obtained by mixing an aqueous solution of the graphene oxide sheet with a polymer emulsion, evaporating water, crosslinking, forming the mixture into a sheet shape, and then reducing the graphene oxide using a reducing agent.

Here, examples of the polymer emulsion that can be used include a polyester emulsion, a latex, and a urethane emulsion. Furthermore, for the process of crosslinking, crosslinking can be carried out by fusion under heat, or by using a known crosslinking agent.

The weight ratio of the graphene oxide sheet with respect to the solids content of the polymer emulsion is suitably 0.01 wt % to 50 wt %, more suitably 0.1 wt % to 30 wt %, and even more suitably 0.5 wt % to 20 wt %. Furthermore, the electrical resistance of the conductive film is suitably $10^{10}$ Ω/cm or less, and more suitably $10^6$ Ω/cm or less. There are no particular limitations on the lower limit, but for example, the lower limit is $10^{-3}$ Ω/cm.

Conductive Resin

In regard to the conductive resin, a conductive material can be obtained by mixing polymer particles with an aqueous solution of the graphene oxide sheet, drying the mixture, and reducing the graphene oxide sheet. As the polymer particles, various polymer powders can be used, and there are no particular limitations. However, for example, polymers such as a fluororesin, rubber, polyurethane, a polyester, and a polyolefin can be used.

The weight ratio of the graphene oxide sheet with respect to the polymer particles is suitably 0.01 wt % to 50 wt %, more suitably 0.1 wt % to 30 wt %, and even more suitably 0.5 wt % to 20 wt %. Furthermore, the electrical resistance of the conductive resin is suitably $10^{10}$ Ω/cm or less, and more suitably $10^5$ Ω/cm or less. There are no particular limitations on the lower limit, but for example, the lower limit is $10^{-3}$ Ω/cm.

<Carbon Fiber>

The graphene oxide sheet according to the invention can be applied to carbon fibers. For example, a carbon fiber can be obtained by spinning a mixture containing the graphene oxide sheet and polyacrylonitrile, and flame-proofing, and carbonizing the mixture. That is, polyacrylonitrile is dissolved in an aqueous colloidal solution containing the graphene oxide sheet, and thereby an aqueous solution containing the graphene oxide sheet at a high concentration is prepared. A polyacrylonitrile (PAN)-based polymer is dissolved using this solution, and thus, a PAN-based precursor fiber is produced. The precursor fiber is subjected to the processes of flame-proofing/preliminary carbonization and a carbonization treatment at high temperatures, and thus a carbon fiber having high tensile strength and a high tensile modulus can be obtained.

Here, flame-proofing is suitable for slowly oxidizing the PAN-based precursor fiber over time. A fiber that has been subjected to the process becomes jet-black in appearance and does not burn easily even when brought close to fire. The flame-proofing treatment is carried out in air, and the temperature is suitably 200° C. to 300° C. The treatment time is not particularly limited, and for example, the treatment time is 1 to 24 hours.

Subsequently, in the preliminary carbonization, the flame-proofed fiber is carbonized at a high temperature in an inert gas atmosphere of nitrogen gas or the like. There are no particular limitations on the temperature of the preliminary carbonization treatment, but for example, the temperature is suitably 600° C. to 3,000° C. When the temperature is further increased in an inert gas atmosphere in the carbonization process, a graphitized carbon fiber can be obtained. Here, there are no particular limitations on the temperature of the carbonization treatment, but for example, the temperature is suitably 1,000° C. to 4,000° C. Here, the carbonization treatment is optional, and only a preliminary carbonization treatment may be carried out.

Here, there are no particular limitations on the tensile strength of the carbon fiber, but the tensile strength is suitably 5,000 MPa or greater. There are no particular limitations on the upper limit, but for example, the upper limit is 100,000 MPa or less. Furthermore, the tensile modulus is not particularly limited, but is suitably 300 GPa or more. There are no particular limitations on the upper limit, but for example, the upper limit is 10,000 GPa or less.

<High-Strength Lightweight Metal Material>

The graphene oxide sheet according to the invention can be applied as a high-strength lightweight metal material (high-strength light metal). The high-strength lightweight metal material can be produced by mixing a metal powder with an aqueous solution of the graphene oxide sheet, evaporating water to prepare a mixed powder of the metal powder and the graphene oxide sheet, and subjecting the mixed powder simultaneously to heating and pressurization in a vacuum using a discharge plasma sintering apparatus. Here, the metal is not particularly limited, and it is suitable to use various metal material such as aluminum, iron (including steel), copper, magnesium, and titanium, or alloys containing these metals. Here, discharge plasma sintering is a method of passing a pulse current to an object material, concentrating high density energy, and thereby obtaining a sintered object. Through this method, a metal material which has been reduced in weight as compared with conventional iron materials can be obtained. Furthermore, the metal exhibits high strength. From the viewpoint of obtaining a metal material having a reduced weight, it is suitable to use aluminum.

Other Application Examples

Sodium hydroxide is dissolved in an aqueous colloidal solution containing the graphene sheet, and then water is evaporated at 240° C. Thus, sodium hydroxide containing molten graphene sheets is prepared. This molten sodium hydroxide is used, and an alumina containing graphene is prepared. Through the electric melting process, a high-strength aluminum metal material employing graphene sheets as a reinforcing material can be realized.

When an aqueous colloidal solution containing graphene sheets is mixed with an organic solvent containing a reducing agent, an organic solvent containing reduced graphene sheets is prepared. This organic solvent containing graphene sheets is used as a coating material, and thereby an antifouling coating material for ships and the like can be realized.

A transistor employing graphene as a material can be realized by adjusting the width of the graphene sheets to the order of nanometers.

When an aqueous colloidal solution containing the graphene sheets is added to cement, mortar or concrete having high mechanical strength can be realized.

EXAMPLES

Reference Example 1

Preparation of high-concentration, high-dispersity aqueous colloidal solution of graphite: 5 g of 3-[(3-cholamidopropyl)dimethylamino]-propanesulfonic acid (CHAPS) was added to 1,000 g of water, and the mixture was stirred for 5 minutes at room temperature. 200 g of graphite was added to this mixture, and thus an aqueous colloidal solution of individual dispersion of graphite was obtained. This graphite-dispersed aqueous colloidal solution was centrifuged at 3,000 g to remove graphite of large sizes (precipitates). The particle size distribution of the aqueous colloidal solution of individual dispersion of graphite thus obtained was analyzed, and the results described above were obtained. It was found that the maximum particle size was 1200 nanometers or less. The results are presented in FIG. 1.

Reference Example 2

Figure 2:
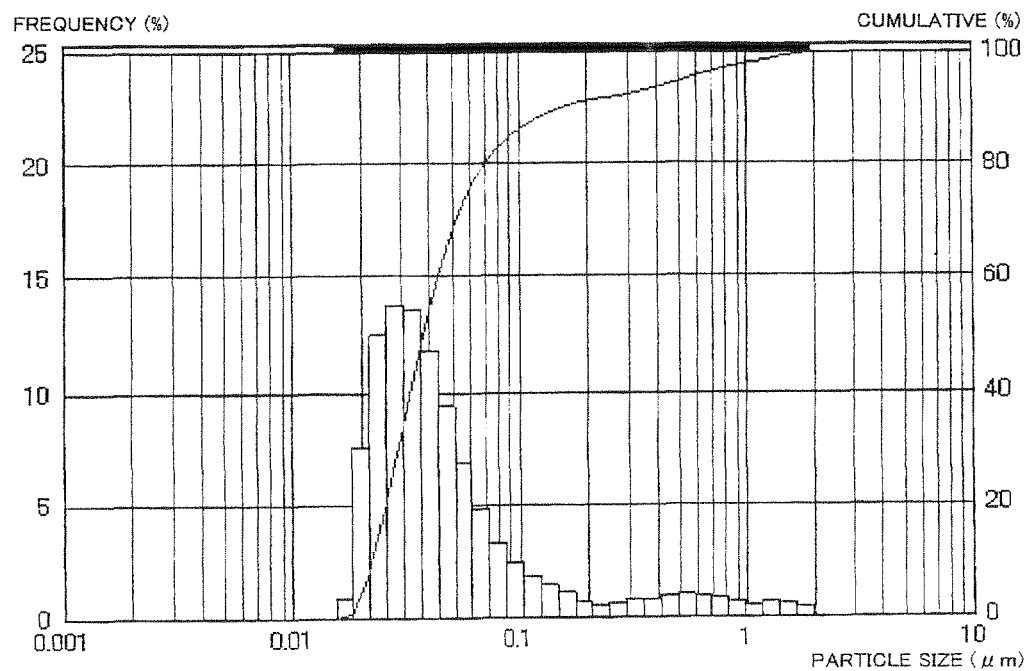
FIG. 2 is a diagram illustrating the analysis results for the particle size distribution of the colloidal solution according to Reference Example 2.
Figure 3:
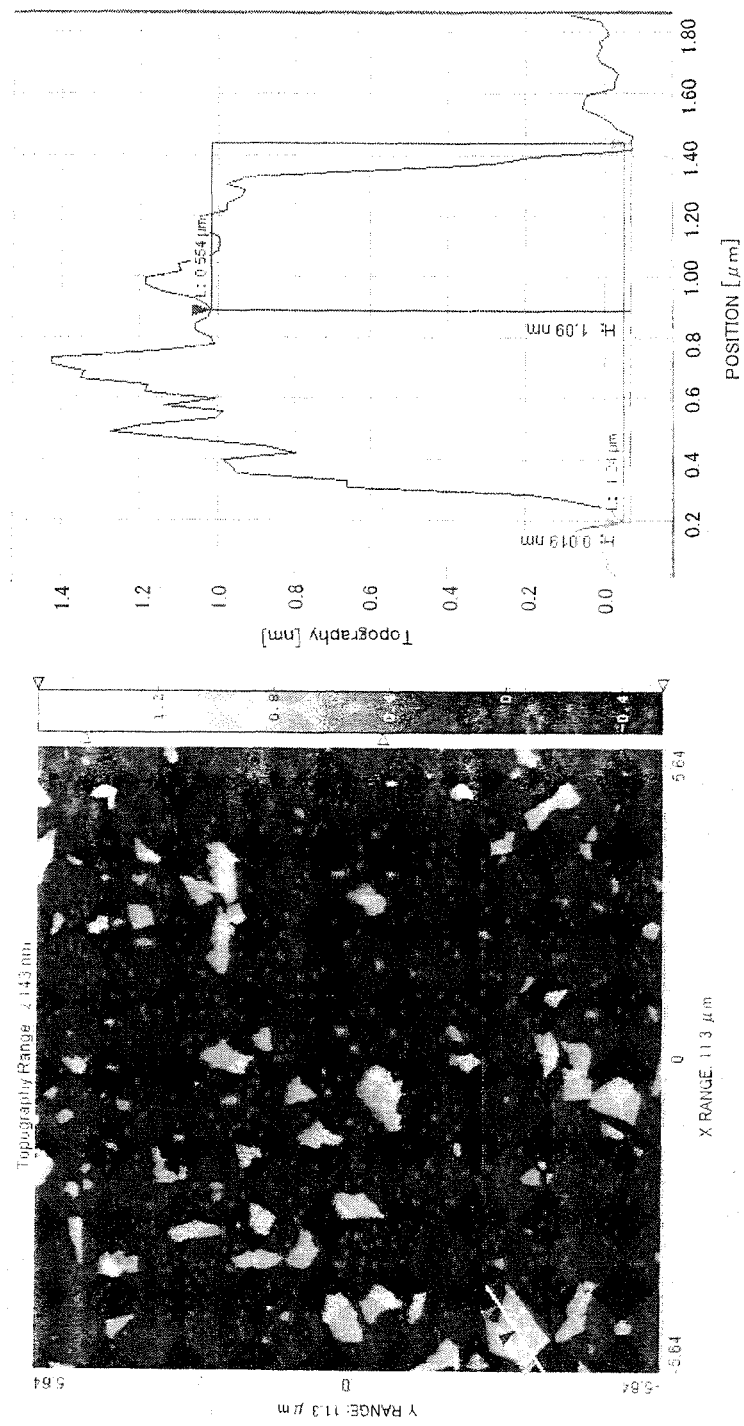
FIG. 3 is an atomic force micrograph of the graphene oxide sheet according to the invention, and a diagram illustrating the results of a shape analysis.
Figure 4:
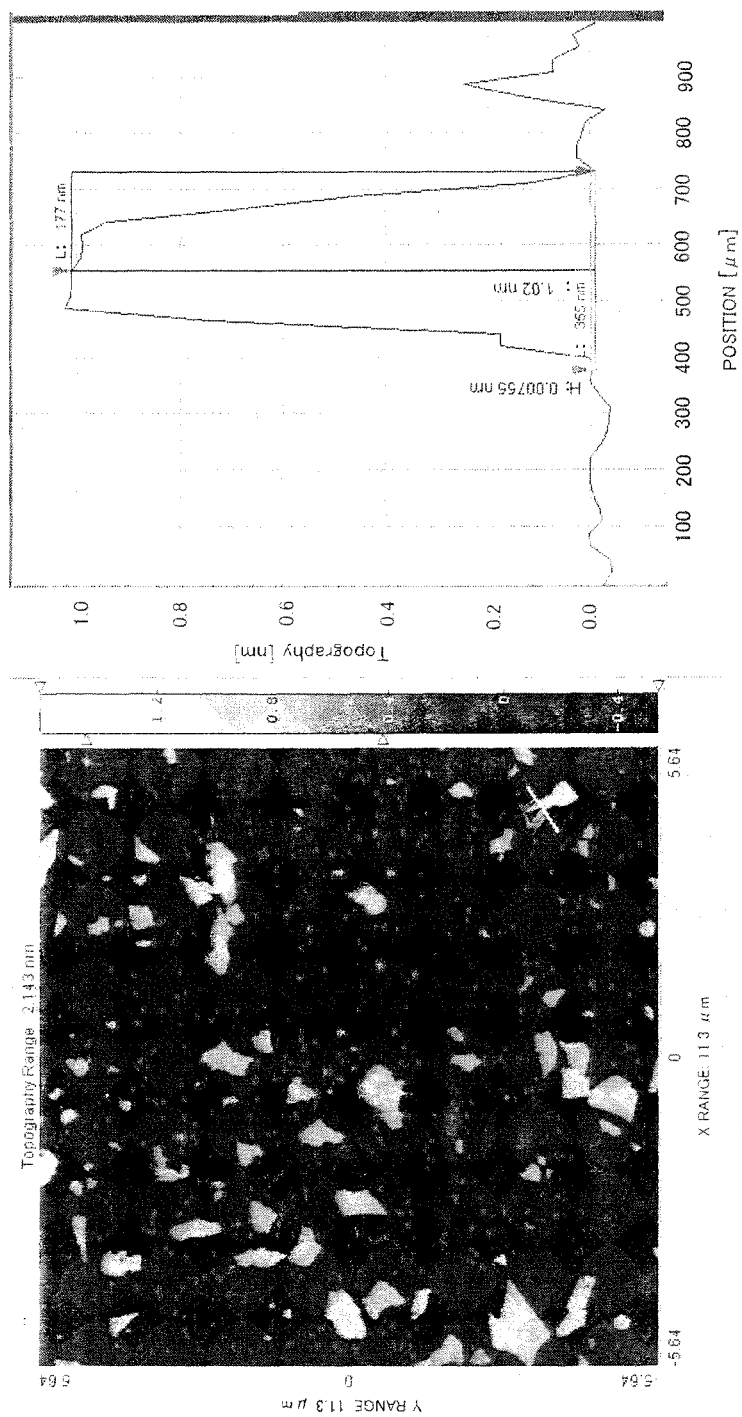
FIG. 4 is an atomic force micrograph of the graphene oxide sheet according to the invention, and a diagram illustrating the results of a shape analysis.
Figure 5:
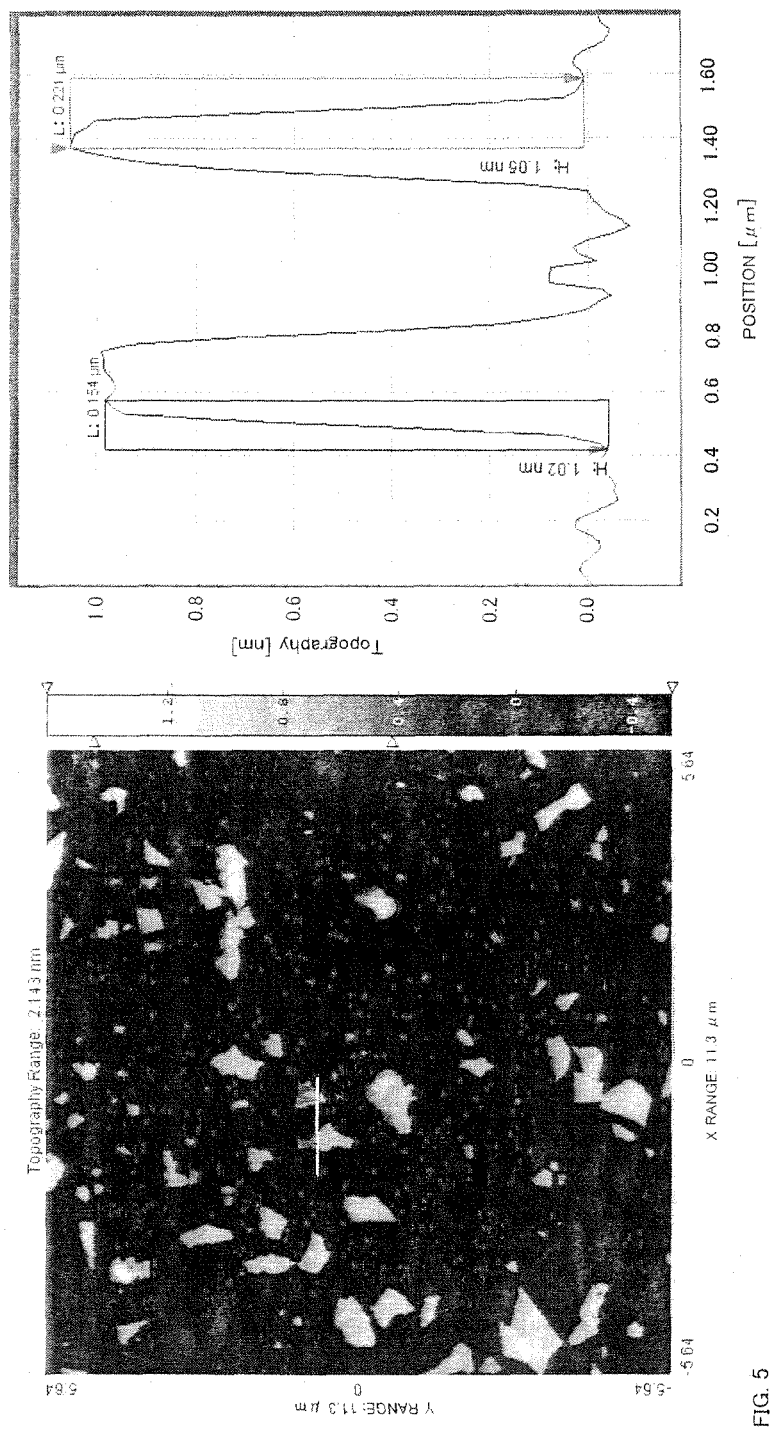
FIG. 5 is an atomic force micrograph of the graphene oxide sheet according to the invention, and a diagram illustrating the results of a shape analysis.
Figure 6:
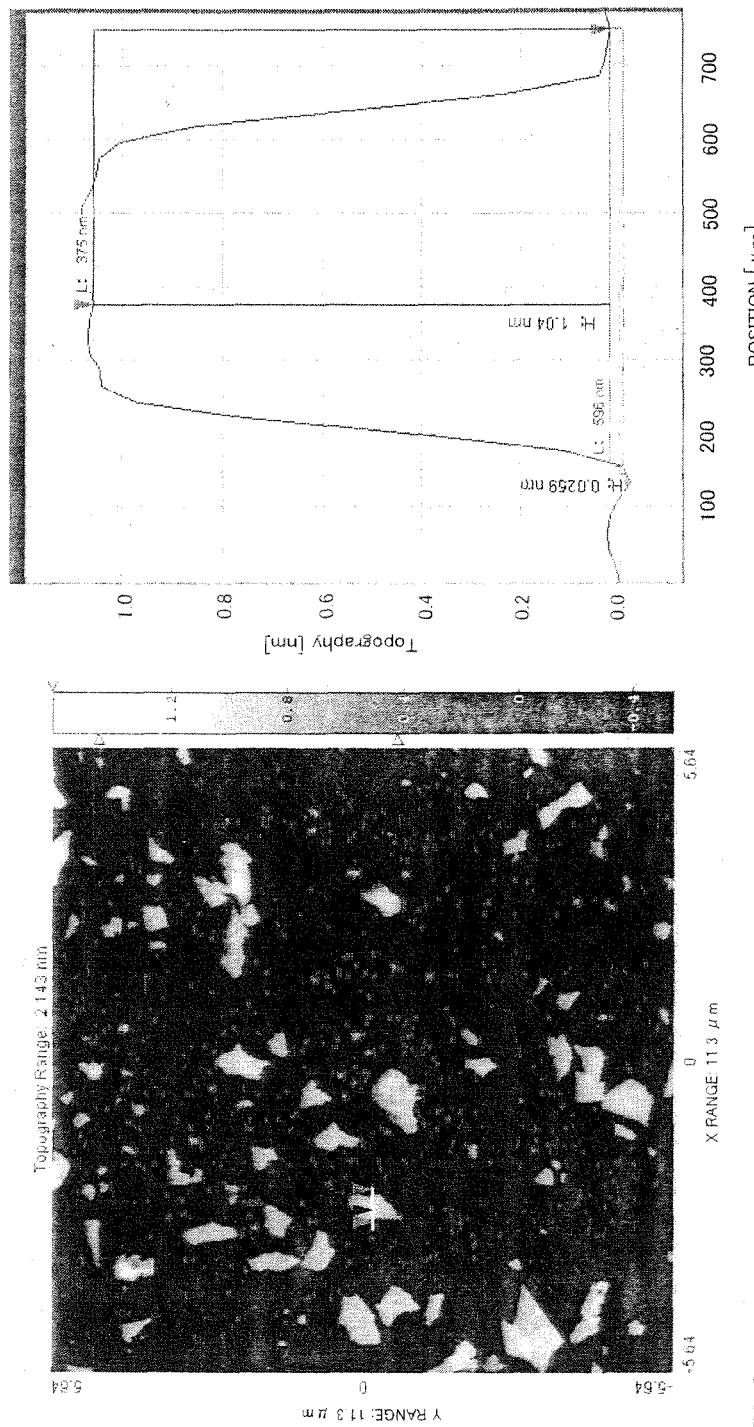
FIG. 6 is an atomic force micrograph of the graphene oxide sheet according to the invention, and a diagram illustrating the results of a shape analysis.
Figure 7:
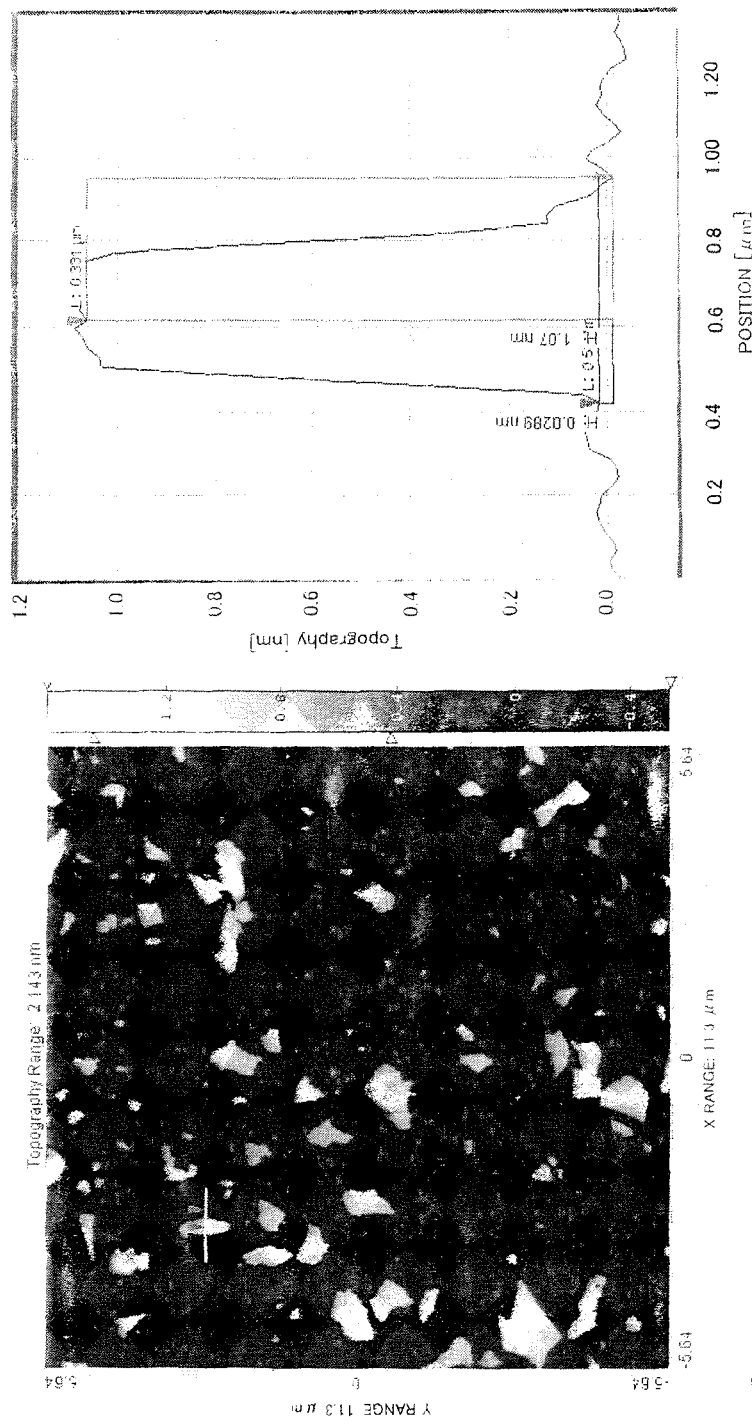
FIG. 7 is an atomic force micrograph of the graphene oxide sheet according to the invention, and a diagram illustrating the results of a shape analysis.
Figure 8:
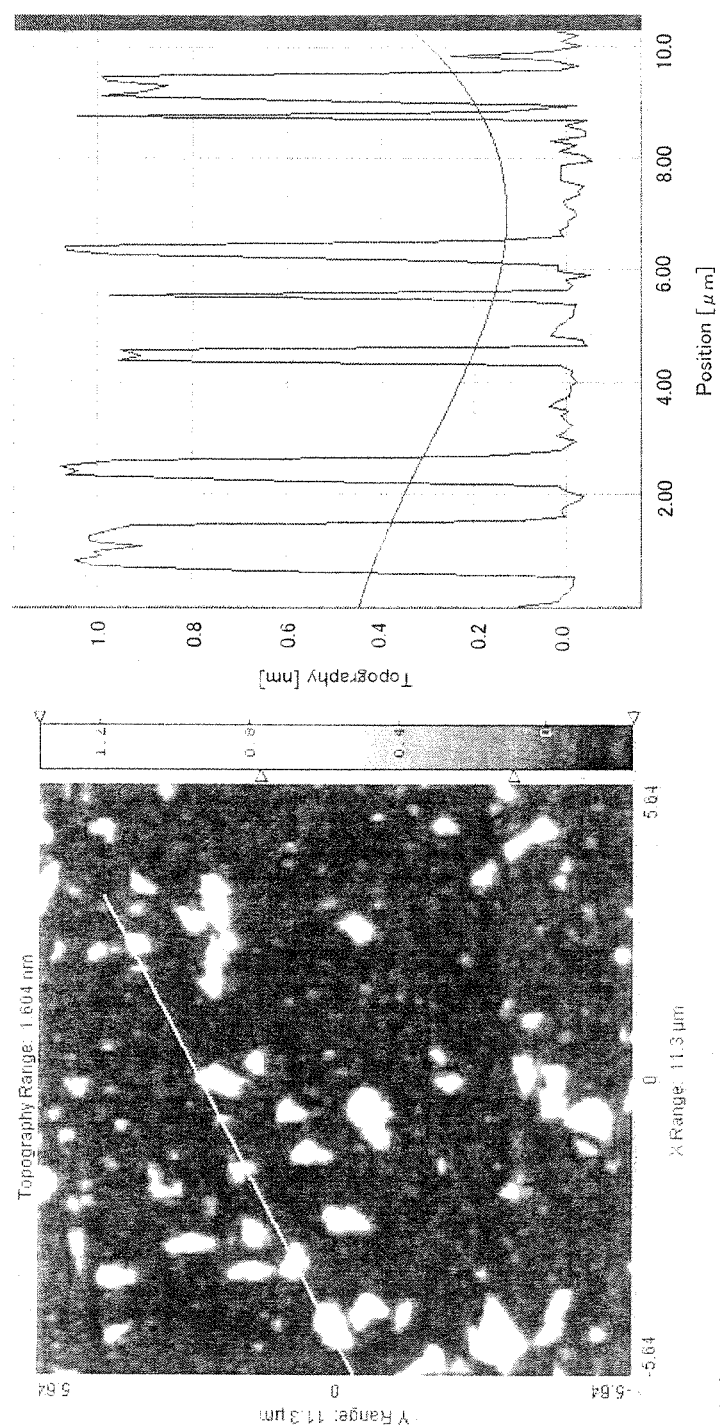
FIG. 8 is anatomic force micrograph of the graphene oxide sheet according to the invention, and a diagram illustrating the results of a shape analysis.
Figure 9:
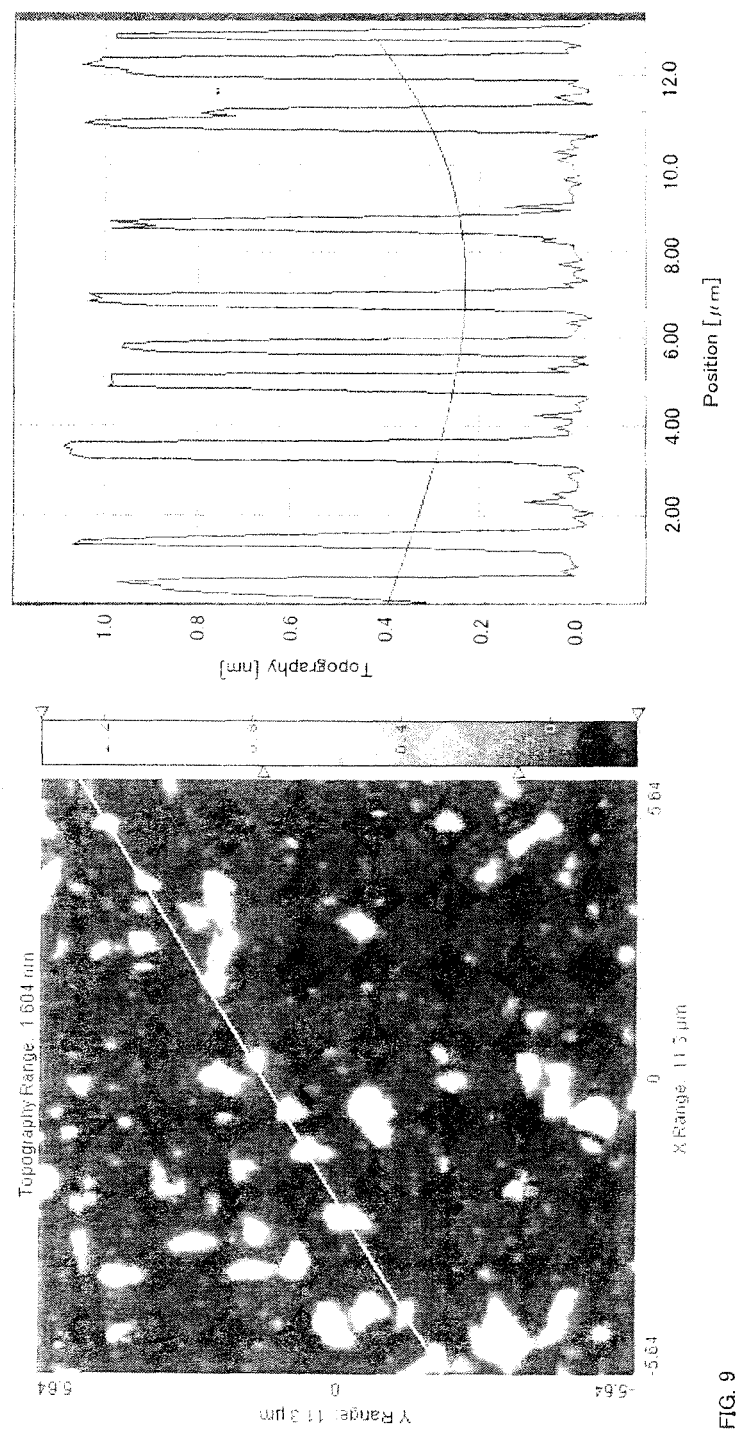
FIG. 9 is anatomic force micrograph of the graphene oxide sheet according to the invention, and a diagram illustrating the results of a shape analysis.
Figure 10:
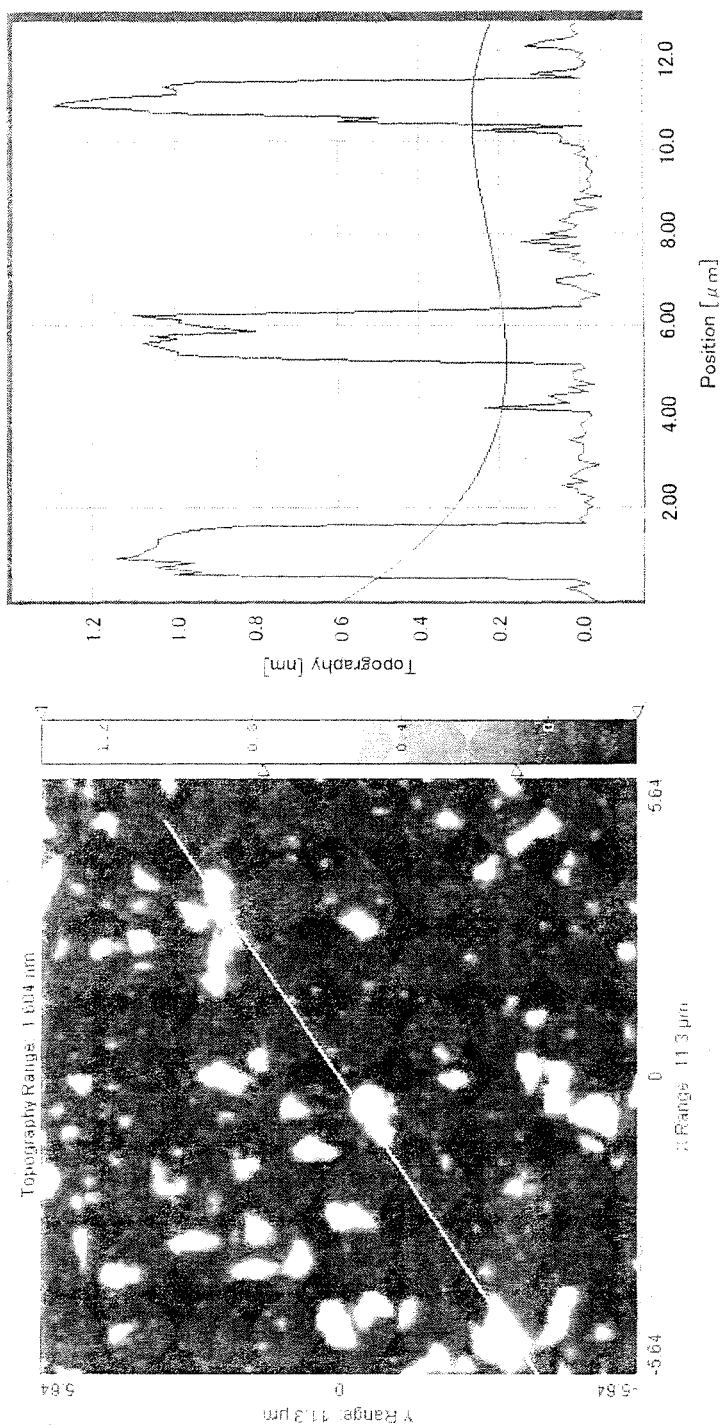
FIG. 10 is anatomic force micrograph of the graphene oxide sheet according to the invention, and a diagram illustrating the results of a shape analysis.

Preparation of high-concentration, high-dispersity aqueous colloidal solution of graphite: 5 g of sodium cholate was added to 1,000 g of water, and the mixture was stirred for 5 minutes at room temperature. 200 g of graphite was added to this mixture, and thus an aqueous colloidal solution of individual dispersion of graphite was obtained. This graphite-dispersed aqueous colloidal solution was centrifuged at 3,000 g to remove graphite of large sizes (precipitates). The particle size distribution of the aqueous colloidal solution of individual dispersion of graphite thus obtained was analyzed, and the results described above were obtained. It was found that the maximum particle size was 1200 nanometers or less. The results are presented in FIG. 2.

Example 1

Production of Graphene Sheet

1) Preparation of high-concentration, high-dispersity aqueous colloidal solution of graphite: 5 g of 3-[(3-cholamidopropyl)dimethylamino]-propanesulfonic acid (CHAPS) was added to 1,000 g of water, and the mixture was stirred for 5 minutes at room temperature. 200 g of graphite was added to this mixture, and thus an aqueous colloidal solution of individual dispersion of graphite was obtained. This graphite-dispersed aqueous colloidal solution is centrifuged at 3,000 g, and graphite of large sizes (precipitates) is removed.

2) Addition of oxidizing agent: 500 g of potassium permanganate and 100 g of sodium nitrate were added to the graphite-dispersed aqueous colloidal solution, and the mixture was stirred. The components were completely dissolved, and then a mixed fan powder of graphite/potassium permanganate/sodium nitrate was produced by lyophilization.

3) Oxidation treatment of graphite: The mixed powder is mixed with concentrated sulfuric acid while the mixture is cooled (ice cooling, while preventing the temperature from exceeding 25° C.). Concentrated sulfuric acid is added in small amounts. The total amount of addition is adjusted to 4 liters. After concentrated sulfuric acid is added, the temperature is raised to 35° C., and the reaction is maintained for 10 minutes. Thereafter, deionized water is added in small amounts, and the total amount is adjusted to 10 liters. The reaction is maintained for 10 minutes. Thereafter, deionized water is further added thereto, and the total volume of the solution is adjusted to 15 liters. A 20 wt % aqueous hydrogen peroxide solution is added to cause the solution to turn transparent and dark orange in color.

4) Purification of graphene sheets: The graphene-dispersed aqueous solution is purified by using an anion exchange column (strong base type ion exchange resin) and a cation exchange column (strong acid type ion exchange resin), and thus the carboxyl group that is in a salt form is converted to an acidic carboxyl group. Thereby, the graphene sheets are converted to acidic graphene oxide sheets.

FIGS. 3 to 10 illustrate the evaluation results for the graphene oxide sheet obtained with an atomic force microscope by using graphite as a starting substance and performing the operating processes described above. The data such as the size of the graphene oxide sheet thus obtained are summarized in Table 1.

Example 2

Figure 11:
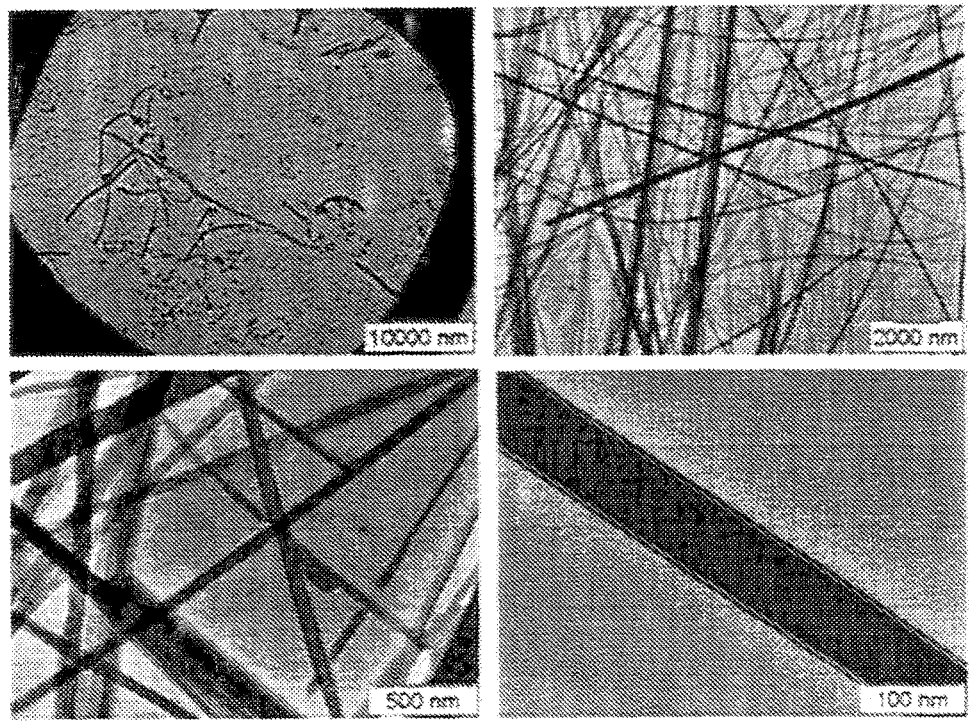
FIG. 11 is a transmission electron micrograph of the graphene oxide sheet according to the invention.

A band-shaped graphene oxide sheet was produced in the same manner as in Example 1, except that multilayer carbon nanotubes as the graphene-containing carbon material. FIG. 11 illustrates a transmission electron micrograph of the graphene oxide sheet thus obtained.

Example 3

Friction Material for Automobiles

Figure 12:
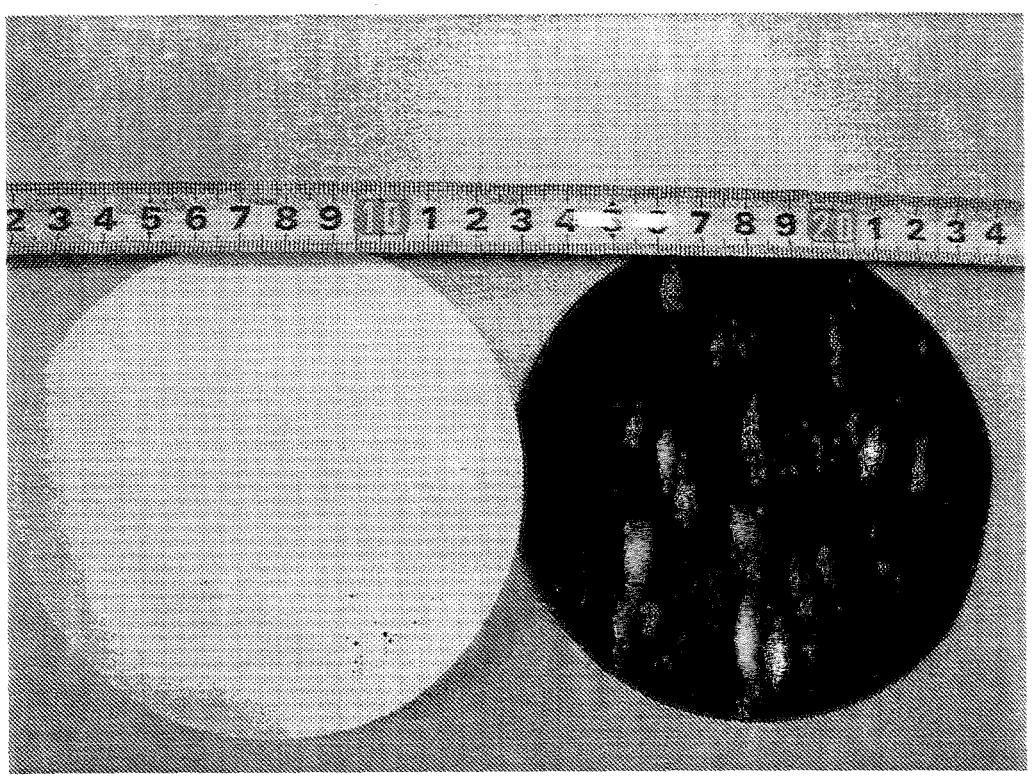
FIG. 12 is a photograph of the friction material according to the invention.

A commercially available filter paper was immersed in the aqueous solution of graphene oxide sheets of Example 1 for 10 minutes, and then the filter paper was dried at 80° C. Thereafter, the filter paper was reduced with an aqueous solution of sodium hydrosulfite for 30 minutes at 100° C., and thus a conductive paper was produced. FIG. 12 illustrates a photograph of the conductive paper. The electrical resistance of the obtained graphene sheet-impregnated paper was $10 \times 10^3 \Omega/$. The electrical resistance was measured by a four-terminal method. After the conductive paper was impregnated with an epoxy resin and fixed, the friction and thermal conductivity of the conductive paper were measured. Meanwhile, the dynamic friction coefficient was measured using a SAE testing machine. The results are presented in Table 2.

TABLE 2

| Thermally conductive material | Graphene sheet | Multilayer carbon nanotubes | Graphite (conventional product) |
|---|---|---|---|
| Amount of addition (%) | 0.05 | 5 | |
| Dynamic friction coefficient | 0.12 | 0.12 | 0.12 |
| Amount of wear (μ) | 56 | 154 | 61 |
| Heat spot | Absent | Present | Present |

TABLE 1

| ID | Type | Length [nm] | Breadth [nm] | Area [nm²] | Z Minimum [nm] | Z Maximum [nm] | Z Mean [nm] | Z Std. Dev. [nm] | Aspect Ratio |
|---|---|---|---|---|---|---|---|---|---|
| 1 | Particle | 686.82 | 366.82 | 164359.49 | 0.32 | 1.06 | 0.89 | 0.2 | 1.87 |
| 2 | Particle | 1058.91 | 331.22 | 209140.55 | 0.32 | 1.07 | 0.9 | 0.17 | 3.2 |
| 3 | Particle | 876.36 | 282.36 | 142077.12 | 0.32 | 1.14 | 0.81 | 0.26 | 3.1 |
| 4 | Particle | 754.53 | 493.23 | 262142.29 | 0.32 | 1.31 | 0.89 | 0.26 | 1.53 |
| 5 | Particle | 595.02 | 476.65 | 168253.49 | 0.34 | 1.07 | 0.87 | 0.2 | 1.25 |
| 6 | Particle | 801.42 | 567.75 | 194051.28 | 0.32 | 1.04 | 0.77 | 0.21 | 1.41 |
| 7 | Particle | 950.22 | 404.67 | 258789.12 | 0.32 | 1.1 | 0.88 | 0.21 | 2.35 |
| 8 | Particle | 936.73 | 606.43 | 344998.08 | 0.32 | 1.13 | 0.92 | 0.2 | 1.54 |
| 9 | Particle | 941.85 | 396.43 | 236344.51 | 0.33 | 1.15 | 0.89 | 0.21 | 2.38 |
| 10 | Particle | 661.09 | 486.48 | 199892.29 | 0.32 | 1.11 | 0.89 | 0.21 | 1.36 |
| 11 | Particle | 569.78 | 507.01 | 169659.66 | 0.32 | 1.08 | 0.86 | 0.22 | 1.12 |
| 12 | Particle | 716.97 | 523.95 | 262683.13 | 0.32 | 1.17 | 0.9 | 0.2 | 1.37 |
| 13 | Particle | 838.47 | 510.02 | 238832.34 | 0.34 | 1.08 | 0.88 | 0.19 | 1.64 |
| 14 | Particle | 1044.11 | 625.98 | 457870.16 | 0.32 | 1.21 | 0.93 | 0.17 | 1.67 |
| 15 | Particle | 983.56 | 560.13 | 341104.08 | 0.32 | 1.11 | 0.94 | 0.2 | 1.76 |
| 16 | Particle | 715.82 | 474.8 | 249054.11 | 0.32 | 1.14 | 0.83 | 0.24 | 1.51 |
| 17 | Particle | 1248.22 | 856.69 | 651596.94 | 0.32 | 1.18 | 0.9 | 0.21 | 1.46 |
| 18 | Particle | 720.95 | 616.11 | 308491.78 | 0.32 | 1.18 | 0.92 | 0.19 | 1.17 |
| 19 | Particle | 966.62 | 601.4 | 277880.57 | 0.32 | 1.04 | 0.8 | 0.18 | 1.61 |
| 20 | Particle | 605.9 | 401.85 | 143915.96 | 0.32 | 1.07 | 0.82 | 0.23 | 1.51 |
| 21 | Particle | 1076.87 | 454.68 | 333748.73 | 0.32 | 1.16 | 0.93 | 0.21 | 2.37 |
| 22 | Particle | 844.24 | 418.08 | 234992.42 | 0.32 | 1.13 | 0.9 | 0.21 | 2.02 |
| 23 | Particle | 1239.13 | 453.53 | 368308.03 | 0.32 | 1.28 | 0.88 | 0.22 | 2.73 |
| 24 | Particle | 1970.11 | 1037.06 | 980532.25 | 0.32 | 1.15 | 0.94 | 0.19 | 1.9 |
| Minimum | | 569.78 | 282.36 | 142077.13 | 0.32 | 1.04 | 0.77 | 0.17 | 1.12 |
| Maximum | | 1970.11 | 1037.06 | 980532.25 | 0.34 | 1.31 | 0.94 | 0.26 | 3.2 |
| Mean | | 908.49 | 518.89 | 299946.59 | 0.32 | 1.13 | 0.88 | 0.21 | 1.83 |
| Std. Dev. | | 295.1 | 161.83 | 183259.78 | 0.01 | 0.07 | 0.05 | 0.02 | 0.58 |

Examples 4 to 7

Dyed Type Conductive Fibers

Example 4

Figure 13:
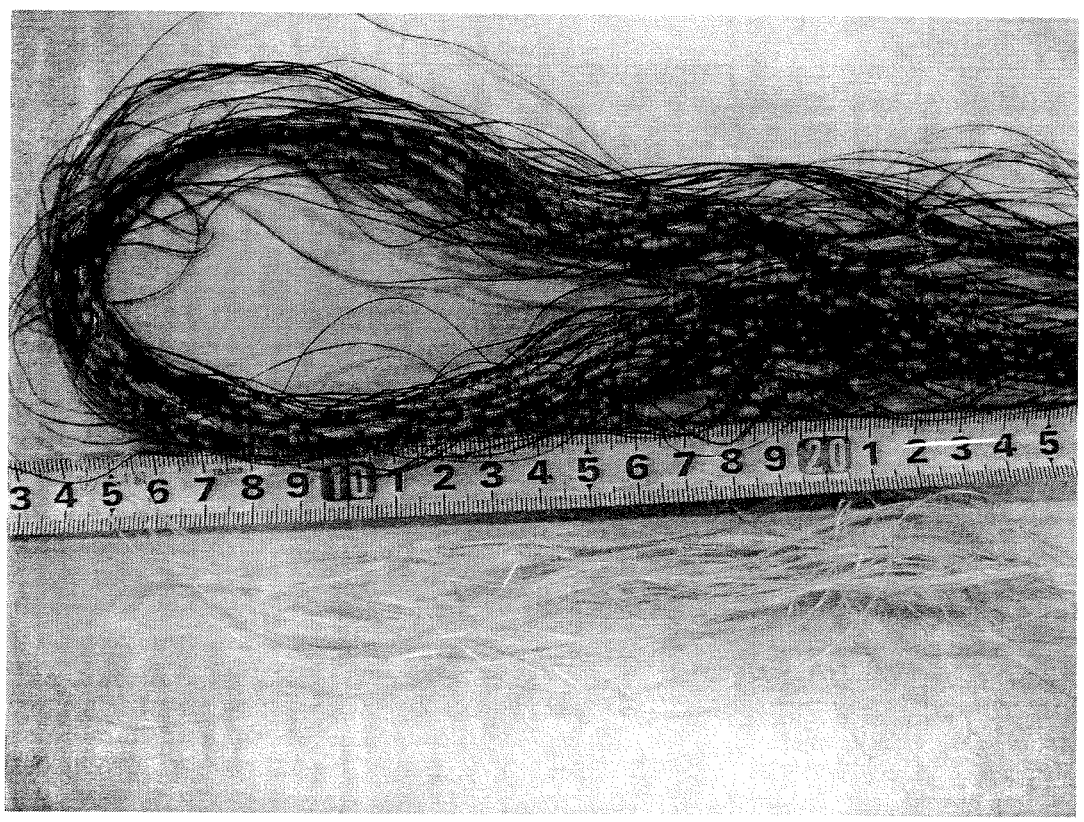
FIG. 13 is a photograph of the dyed conductive fiber according to the invention.

A polyallylate fiber, which is a high strength fiber, was subjected to refinement and bleaching treatments, and then the polyallylate fiber was introduced into an autoclave filled with an aqueous solution of the graphene oxide sheet and dyed for 30 minutes. Here, the amount of deposition of the graphene oxide sheet was 0.8 wt %. Thereafter, the fiber was subjected to a reduction treatment using an aqueous solution of sodium hydrosulfite, and a conductive yarn was produced. FIG. 13 presents a photograph of the conductive yarn produced by dyeing a polyallylate fiber using the graphene sheet as a dye (a white colored area represents the original yarn before the dyeing treatment, and a black colored area represents the yarn after the reduction treatment; conductivity was $2.7 \times 10^3$ Ω/cm). Here, the electrical resistance was measured using an ADVANTEST R8340A.

Example 5

Similarly, an aramid fiber was used as an original yarn and was subjected to refinement and bleaching treatments. Subsequently, the aramid fiber was introduced into an autoclave filled with an aqueous solution of the graphene oxide sheet and dyed for 30 minutes. Here, the amount of deposition of the graphene oxide sheet was 0.7 wt %. Thereafter, the fiber was subjected to a reduction treatment using an aqueous solution of sodium hydrosulfite, and a conductive yarn was produced. The conductivity was $3.6 \times 10^3$ Ω/cm. Here, the electrical resistance was measured by the same method as that used in Example 4.

Example 6

A nylon yarn wound on a bobbin was subjected to refinement and bleaching treatments. Subsequently, the fiber was introduced into an autoclave filled with an aqueous solution of the graphene oxide sheet and dyed for 30 minutes. Here, the amount of deposition of the graphene oxide sheet was 0.5 wt %. Thereafter, the fiber was subjected to a reduction treatment using an aqueous solution of sodium hydrosulfite, and a conductive yarn was produced. The conductivity was $8.3 \times 10^3$ Ω/cm. Here, the electrical resistance was measured by the same method as that used in Example 4.

Example 7

A cotton yarn wound on a bobbin was subjected to refinement and bleaching treatments. Subsequently, the fiber was introduced into an autoclave filled with an aqueous solution of the graphene oxide sheet and dyed for 30 minutes. Here, the amount of deposition of the graphene oxide sheet was 0.3 wt %. Thereafter, the fiber was subjected to a reduction treatment using an aqueous solution of sodium hydrosulfite, and a conductive yarn was produced. The conductivity was $5.3 \times 10^3$ Ω/cm. Here, the electrical resistance was measured by the same method as that used in Example 4.

Examples 8 and 9

Kneaded Type Conductive Fiber

Example 8

An aqueous solution of the graphene oxide sheet was mixed with an aqueous solution of polyvinyl alcohol (PVA), and the mixture was adjusted such that the content of PVA would be 5.0 wt %, while the content of the graphene oxide sheet would be 0.5 wt %. The mixture was subjected to the processes of spinning, drying, stretching and reduction, and thus a conductive fiber having a network of the graphene sheets as a skeleton was produced. The electrical resistance of the fiber thus obtained was in the order of $10 \times 10^5$ Ω/cm. The electrical resistance measured here was measured by the same method as that used in Example 4.

Example 9

Ethylene glycol and an aqueous solution of the graphene oxide sheet (1 wt % with respect to ethylene glycol) were mixed, and then water was evaporated at 95° C. Thus, the graphene oxide sheet was transferred and dispersed in the ethylene glycol. This was used as a raw material to synthesize a polyethylene terephthalate fiber. Here, the content of the graphene oxide sheet was 0.5 wt %. The fiber was subjected to a reduction treatment for 60 minutes at 100° C. using an aqueous solution of sodium hydrosulfite, and then a conductive yarn having an electrical resistance in the order of $10 \times 10^5$ Ω/cm was produced. The electrical resistance measured here was measured by the same method as that used in Example 4.

Example 10

Conductive Film

An aqueous solution of the graphene oxide sheet was mixed with a polyester emulsion (solids content 38%) (here, the content of the graphene oxide sheet was adjusted to 2.3 wt % relative to the solids content of the polyester emulsion), and then water was evaporated at 85° C. to induce thermal crosslinking. Thus, a film having a network of the graphene oxide sheet as a skeleton was produced. The film was subjected to a reduction treatment for 60 minutes at 100° C. using an aqueous solution of sodium hydrosulfite, and then a conductive film having an electrical resistance in the order of $10 \times 10^5$ Ω/cm was produced. The electrical resistance was measured by a four-terminal method.

Example 11

Conductive Resin 100 g of a fluororesin (PTFE) powder having a particle size of approximately 50 micrometers was sufficiently mixed with an aqueous solution (1 liter) of 0.5 g of the graphene oxide sheet. Water was evaporated at 85° C., and thus a graphene oxide sheet/resin powder composite was produced. This composite was subjected to a reduction treatment for 60 minutes at 100° C. using an aqueous solution of sodium hydrosulfite, subsequently washed with deionized water, and dried. Thus, a master batch of a conductive fluororesin having an electrical resistance in the order of $10 \times 10^4$ Ω/cm was prepared. The master batch was compression molded under a pressure of 1000 kg/cm$^2$, and then the molding product was sintered for 30 minutes at 340° C. Thus, a test sample was produced. The sample thus obtained had an electrical resistance of $10^4$ Ω/cm, and a tensile strength of 65 MPa. The electrical resistance measured here was measured by the same method as that used in Example 10. Furthermore, the tensile strength was measured by IMADA Force Measurement.

Example 12

High Strength Carbon Fiber

A polyacrylonitrile (PAN)-based polymer was dissolved in an aqueous solution of the graphene oxide sheet (the content of the graphene oxide was 0.1 wt % based on the PAN-based polymer), and then the solution was spun to produce a precursor fiber (graphene oxide sheet-containing PAN-based precursor fiber). This precursor fiber was heated at high temperatures to thereby subject the precursor fiber to flame-proofing, preliminary carbonization, and carbonization treatments. Thereby, a carbon fiber in which a good balance was achieved between two characteristics, namely, high tensile strength and high tensile modulus, was produced. The carbon fiber containing the graphene sheets thus obtained had a tensile strength increased by 150%, and a tensile modulus increase by 110%, as compared with a control sample produced under the exact same conditions except that the graphene oxide sheet was not incorporated.

Example 13

High-Strength, Lightweight Metal 200 g of an aluminum powder having a particle size of approximately 300 micrometers was sufficiently mixed with an aqueous solution (1 liter) of 0.5 g of the graphene oxide sheet. Water was evaporated at 85° C., and thus a graphene oxide sheet/aluminum powder composite was produced. A test sample was produced by using a discharge plasma sintering apparatus which is capable of subjecting powder particles simultaneously to heating and pressurization in a vacuum atmosphere. The graphene sheet/aluminum composite thus obtained had a tensile strength of 4.3 GPa and a thermal conductivity of 356 W/mK.

INDUSTRIAL APPLICABILITY

The graphene oxide sheet produced according to the invention functions as a dye based on the intercalation effect and can impart electrical conductivity, wear resistance and the like to fibers or leathers through a dyeing treatment. Additionally, the graphene thus produced can markedly increase the mechanical strength of materials such as metals, carbon fibers, plastics and cement, when added to these materials. Furthermore, by controlling the width of graphene sheets to the order of nanometers, semiconductive materials having a thickness at the atomic scale can be created.

The invention claimed is:

1. A method for producing a graphene oxide sheet which changes to a compound having a graphene structure when reduced, the method comprising:
   (a) dispersing a graphene-containing carbon substance, having aggregates, with a dispersant to reduce the size of the aggregate units and to form a colloidal solution containing the graphene-containing carbon substance;
   (b) adding an oxidizing agent to the colloidal solution from step (a), and removing water by lyophilization to adjust the water content to 10 wt % or less to obtain a water-removed composition, the water-removed composition being a powder composition containing the oxidizing agent and the graphene-containing carbon substance; and
   (c) mixing the water-removed composition from step (b) with concentrated sulfuric acid to oxidize the graphene-containing carbon substance.

2. The method according to claim 1, further comprising centrifuging the colloidal solution to remove the aggregates.

3. The method according to claim 1, wherein the dispersant is a surfactant.

4. The method according to any one of claims 1 to 3, further comprising after step (c), purifying the resultant graphene oxide sheet by an ion exchange treatment.

5. The method according to claim 1, wherein the oxidizing agent is permanganate or peroxodisulfate.

6. The method according to any one of claims 1 to 3, wherein the graphene-containing carbon substance is one or more substances selected from the group consisting of a carbon nanotube, a carbon nanofiber, a carbon fiber, a carbon nanohorn, graphite and a fullerence.

7. The method according to claim 3, wherein the surfactant is contained in an amount of 0.01 wt % to 10.0 wt %, based on the weight of the graphene-containing carbon material.

* * * * *